(12) United States Patent
Dominici et al.

(10) Patent No.: US 11,694,279 B1
(45) Date of Patent: Jul. 4, 2023

(54) DYNAMIC CREATION OF INTERACTIVE USER DEVICE POOLS

(71) Applicant: RIPPL APP, LLC, Tampa, FL (US)

(72) Inventors: Peter Dominici, Tampa, FL (US); Bruce Melanson, Tampa, FL (US); Mark Klecka, Cortez, FL (US); Dana Kinney, Tampa, FL (US)

( * ) Notice: Subject to any disclaimer, the term of this patent is extended or adjusted under 35 U.S.C. 154(b) by 0 days.

(21) Appl. No.: 17/212,859

(22) Filed: Mar. 25, 2021

Related U.S. Application Data

(60) Provisional application No. 62/994,532, filed on Mar. 25, 2020.

(51) Int. Cl.
*G06Q 50/00* (2012.01)
*G06F 16/29* (2019.01)
*H04W 4/021* (2018.01)
*H04W 4/02* (2018.01)

(52) U.S. Cl.
CPC ............ *G06Q 50/01* (2013.01); *G06F 16/29* (2019.01); *H04W 4/022* (2013.01); *H04W 4/023* (2013.01)

(58) Field of Classification Search
CPC ....... G06Q 50/01; G06F 16/29; H04W 4/022; H04W 4/023
See application file for complete search history.

(56) References Cited

U.S. PATENT DOCUMENTS

| | | | |
|---|---|---|---|
| 9,094,519 B1* | 7/2015 | Shuman | H04L 65/1069 |
| 2008/0140650 A1* | 6/2008 | Stackpole | H04W 4/02 |
| | | | 707/999.005 |
| 2013/0185368 A1* | 7/2013 | Nordstrom | H04W 12/02 |
| | | | 709/206 |
| 2013/0325988 A1* | 12/2013 | Morewitz, II | H04L 51/52 |
| | | | 709/206 |
| 2015/0025950 A1* | 1/2015 | Yu | G06Q 30/0274 |
| | | | 705/14.7 |
| 2015/0262245 A1* | 9/2015 | Arvanitis | G06Q 30/0269 |
| | | | 705/14.35 |
| 2016/0135014 A1* | 5/2016 | Alharayeri | H04L 67/12 |
| | | | 455/456.3 |
| 2016/0294748 A1* | 10/2016 | Yang | H04W 4/18 |
| 2016/0316328 A1* | 10/2016 | Baran | H04W 4/50 |
| 2017/0323299 A1* | 11/2017 | Davis | G06Q 20/204 |
| 2018/0324546 A1* | 11/2018 | Jones | G08G 5/045 |
| 2019/0034966 A1* | 1/2019 | Zaheer | G06Q 30/0261 |
| 2020/0285839 A1* | 9/2020 | Donnenfeld | G06V 20/30 |

* cited by examiner

Primary Examiner — Ernest G Tacsik

(57) ABSTRACT

Systems implement a software platform that creates dynamic user device pools that facilitate in-person engagement between and among platform users as well as the participation in local events and activities. The system includes a profile server that communicates with one or more user computing devices, such as smartphones. The provider server determines a pool area that can be predefined or determined based on a geometric area surrounding a user computing device. The provider server determines the user devices within the pool area and obtains profile data associated with the user devices where the profile data represents information personal to the platform users. The provider server applies user relationship information and privacy settings to filter the profile data before transmitting the profile data to user computing devices for display. Platform users communicate with other users in the pool area according to permissions settings that safely limit the types of permissible communications.

20 Claims, 17 Drawing Sheets

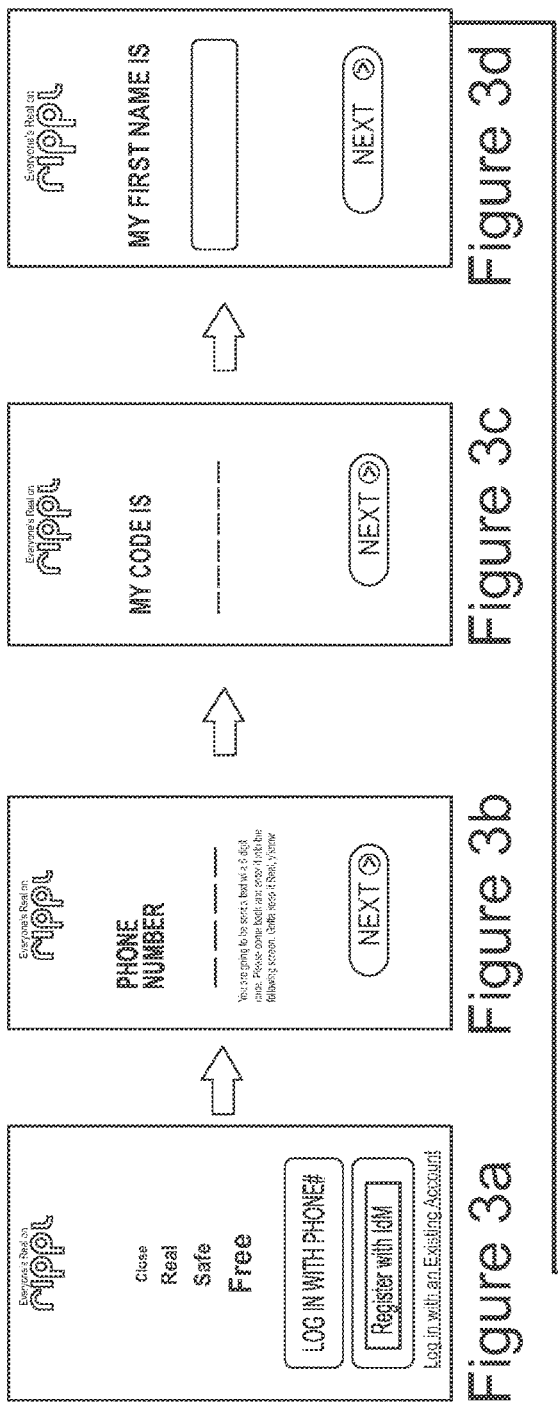
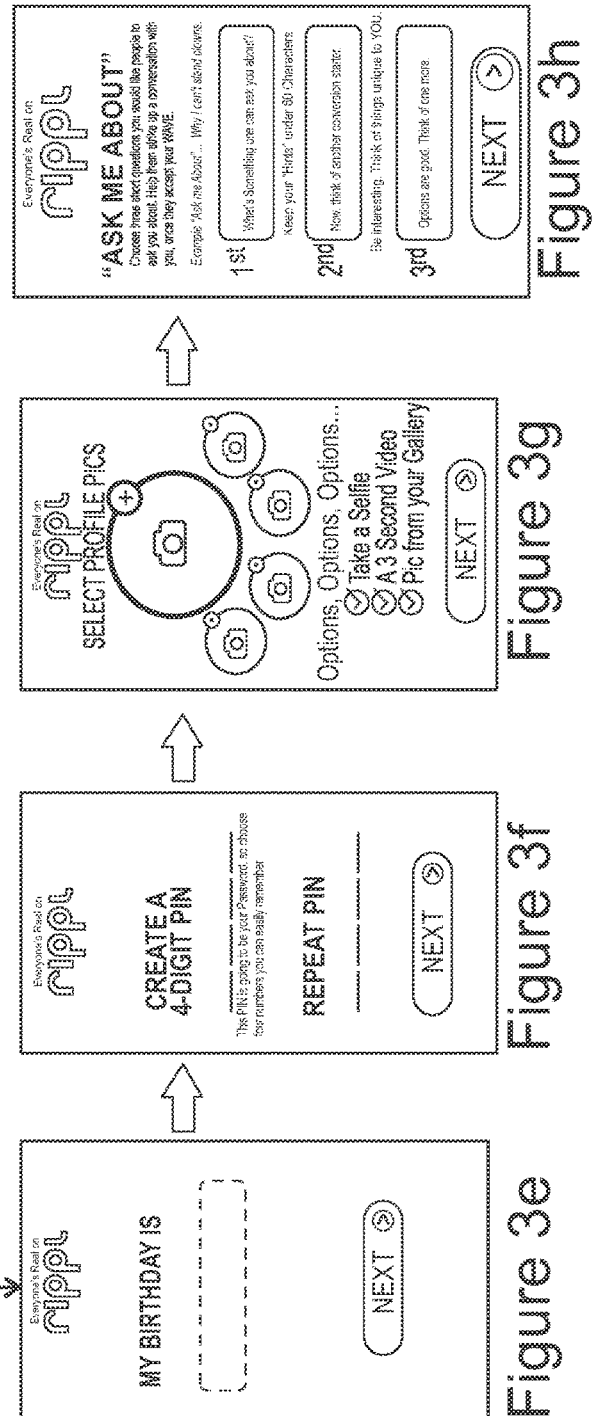

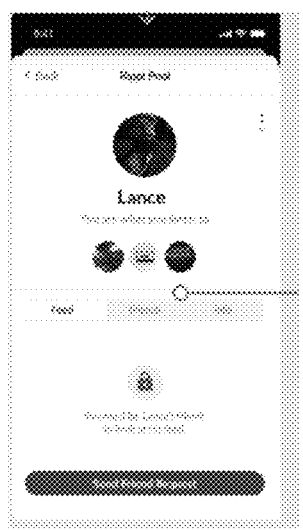
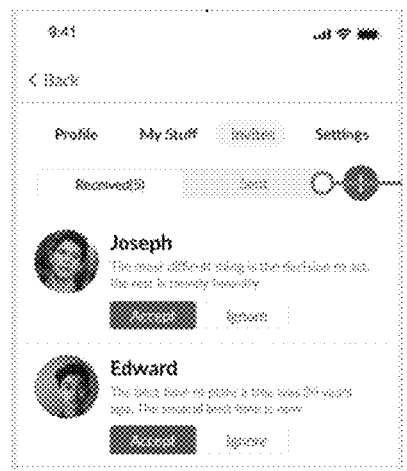
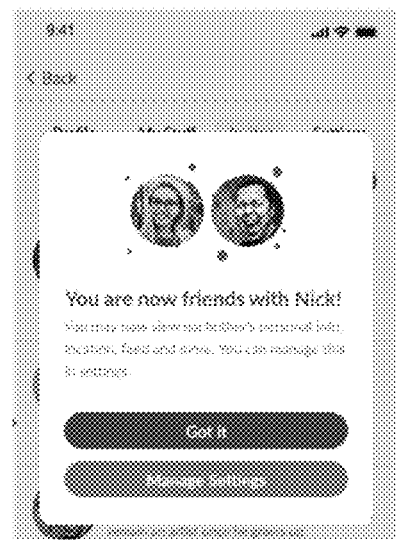
*FIG. 9(a)*   *FIG. 9(b)*   *FIG. 9(c)*

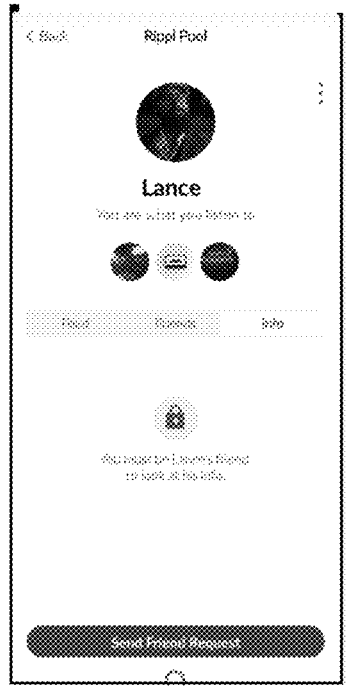
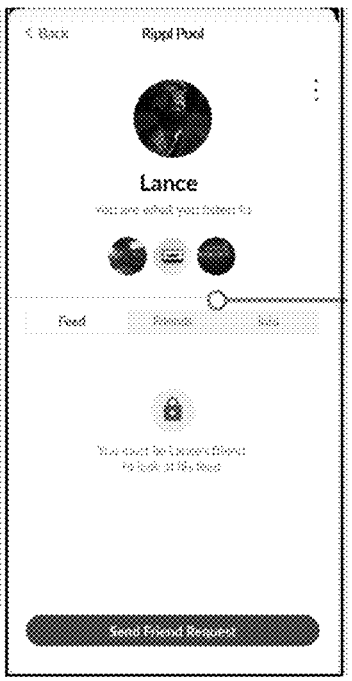
FIG. 10(a)      FIG. 10(b)

DYNAMIC CREATION OF INTERACTIVE USER DEVICE POOLS

CROSS REFERENCE TO RELATED APPLICATION

This application claims priority from U.S. provisional application No. 62/994,532 filed on Mar. 25, 2020, the entirety of which is incorporated herein by reference.

TECHNICAL FIELD AND BACKGROUND

The present invention relates generally to the field of social media software applications and platforms, and more particularly, to a software platform that facilitates in-person, local engagement between and among individual platform users and vendors through the dynamic creation of local area user device pools.

Conventional social media software platforms are focused almost entirely on facilitating remote interaction between users who are often in geographically diverse areas. The remote nature of the interaction imposes upon users the requirement to coordinate meeting locations, times, and activities, and as a result, there is an inherent transaction cost for those users desiring face-to-face engagement. There is also a lack of interaction with local business or entertainment venues that could provide enhanced engagement opportunities for users. The remote nature of the interaction has also led to platform users establishing accounts, or profiles, with false information knowing such deception is difficult for other users to uncover.

Given the shortcomings of conventional social media platforms, it would be advantageous to provide a software platform configured to facilitate convenient, expedient, and safe in-person, local engagement between and among platform users and local vendors. It is, therefore, an object of the present invention to provide a software platform that facilitates such engagement through dynamic creation of individualized, localized user device pool areas.

Through the pool area construct, users are provided with opportunities to safely and securely engage other platform users within the same geographic proximity. Platform users are also provided with opportunities to participate in local events and promotions. Users can control whether or not to participate in a pool area and establish permissions surrounding interactions with other users, which results in enhanced privacy and security over conventional social media platforms. The geographic proximity of platform users within the pool makes it more convenient to meet in-person and discourages the use of false information in the creation of user accounts and profiles. Thus, platform users have a uniquely personal, local, secure, and safe experience while participating in the current platform.

SUMMARY

Disclosed are systems for creating user device pools that includes a provider server with a processor coupled to a first data storage device. The first data storage device includes a non-transitory computer-readable medium with computer-readable code for instructing the provider server processor. The first data storage device also includes at least one relational database that stores (i) pool area data defining a pool area, and (ii) multiple platform user identifiers that are each stored to a database record that includes associated profile data. The profile data includes platform user geolocation data obtained from platform user computing devices. The profile data can also include connection data that represents a connection status or logical relationship between platform users, such as the users being connected as "friends.". A pool indicator is further included in the profile data and indicates whether the corresponding platform user is within the pool area or outside of the pool area. More specifically, the pool indicator has a first value when the platform user geolocation data is within the pool area and a second value when the platform user geolocation data is outside of the pool area.

The provider server processor executes the computer-readable code to perform operation that include receiving a pool data request message transmitted to the provider server by a user computing device. The pool data request message includes user computing device geolocation data and a platform user identifier ("PUID") corresponding to the computing device user. The provider server compares the user computing device geolocation data against the pool area data stored to the relational database to determine whether the user computing device geolocation data falls within the pool area or outside of the pool area.

When the user computing device geolocation data falls within the pool area, the provider server generates a current pool data message that is transmitted to the user computing device that includes, among other things, information about other platform users and user devices within the pool. The platform user information, or profile data, that is sent to the user computing device depends on the existence and type of connection between users.

To generate the current pool data message for a user computing device within the pool area, the provider server selects a preset number of platform user identifiers (i.e., a Pool Population Set-Point number) having a pool indicator that indicates the platform user is also in the pool area (i.e., the pool indicator is set to the first value). The selected platform user identifiers are stored to the relational database as part of a Current Pool Population list. The provider server analyzes the associated connection data to determine whether the platform user identifiers in the Current Pool Population list are connected to the user computing device PUID. If the platform user identifier is connected as a friend, the provider server retrieves more detailed profile data than it would absent the connection. On the other hand, if the platform user identifier is not connected to the user computing device PUID, then the provider server retrieves more limited profile data. The provider server then generates the current pool data message that includes pool area data as well as detailed profile data or limited profile data for each platform user identifier in the Current Pool Population list, as determined from the connection data.

When the user computing device geolocation data falls outside of the pool area, the provider server generates a current pool data message that includes only profile data for platform users that are connected to the user computing device PUID. In this manner, a user cannot see profile or other data for platform users other than those users that are connected to the platform user as "friends" or otherwise until the user computing device enters the pool area. That is, when the user computing device is outside of the pool, the provider server performs the operations of selecting platform user identifiers where the connection data indicates a connection to the PUID. The provider server retrieves detailed profile data for the selected, connected platform user identifiers. The provider server then generates the current pool data message that includes the detailed profile data and transmits the current pool data message to the user computing device.

In another aspect of the system, the profile data can be filtered according to user-defined privacy settings before being transmitted to the user computing devices. For instance, a platform user may elect to omit disclosure of the user's surname, email address, or other profile data. Thus, prior to generating the current pool data message, the provider server performs operations that include retrieving associated privacy settings from the relational database for each selected platform user identifier. The provider server then filters the limited or detailed profile data for each selected platform user identifier according to the privacy setting. The filtered profile data is then used to create the current pool data message.

Users within a pool can communicate using a "wave" messaging technique that first requires users to initiate a wave request message to ask permission to initiate a communication session with another user. With this feature, the provider server receives from the user computing device, a wave request message that includes a wave recipient platform user identifier selected from the Current Pool Population database list. The provider server transmits the wave request message to the wave recipient using the platform user identifier. The provider server next receives from the wave recipient, a wave request response message that includes a Response Selection. When the Response Selection has a value of "Accept," that means the wave request has been accepted, and permission has been granted for the provider server to establish a communication session between the user computing device and the wave recipient. Once the communication session has been initiated, the wave recipient platform user identifier is removed from the Current Pool Population database list.

The communication session between users can limit the type of data exchanged depending on the existence of a connection between users to promote user privacy and security. For instance, if a wave recipient is associated with connection data that does not indicate a connection to the PUID (i.e., the user of the computing device that sent the wave request), then the provider server establishes permissions data that does not permit the exchange of image data or video data during the communication session.

Continuing with this example, to enable the exchange of image data or video data, the users can establish a connection. Either the user computing device that sent the wave request or the wave recipient can transmit a connect invitation message to the provider server. If the connection request is approved, the provider server will receive a confirmation from either the user computing device or the wave recipient. Upon receipt of the confirmation, the provider server will generate connection data indicating a connection between the user computing device PUID and the wave recipient platform user identifier. Based on the connection data, the provider server establishes permissions data that permits the exchange of image data or video data during the communication session.

The system is configured to periodically receive updated geographic location data from the platform user computing devices, including specifically from the platform user computing devices listed within the Current Pool Population database list. The updated geographic location data is used to remove platform user identifiers that are no longer within the pool area. Upon receiving updated geographic location data for each platform user identifier in the Current Pool Population, the provider server determines whether the updated geographic location data is within the pool area. The provider server removes the platform user identifier from the Current Pool Population if the updated geographic location data is not within the pool area. The provider server then selects a replacement platform user identifier for a user that is within the pool area (i.e., the platform user identifier is associated with a platform user pool indicator having a first value). Once selected, the replacement platform user identifier is stored to the Current Pool Population database list.

In another aspect of the system, the provider server can provide the platform users with information concerning events of interest or the activities of other platform users. For instance, the platform server can transmit a current event data message to the user computing device that includes event data such as (a) event identifying data (i.e., name of an event), (b) event location data, and (c) event time data indicating when the event will take place. The provider server can also transmit a current activity data message to the user computing devices that includes activity data for those platform users having connection data indicating a connection. Activity data can include, for instance, information concerning promotional opportunities saved or redeemed by platform users.

In one embodiment, the pool area is defined as a geometric area surrounding a user computing device. The pool area, therefore, moves with the user computing device as the geolocation data for the user computing device changes. More particularly, the provider server periodically received updated user computing device geolocation data transmitted by the user computing device. The pool area data is used by the provider server to define the pool area as having a geographic location and a two-dimensional shape that encompasses the user computing device geolocation data. The geographic location of the pool area changes proportionally to the updated user computing device geolocation data. As an example, the pool area two-dimensional shape and be circular and centered on the user computing device geolocation data.

The user computing device can be configured to display a variety of graphical user interfaces that facilitate interaction between platform users and that display information relating to the pool area and users within the pool area. The user computing device includes a processor coupled to a second data storage device. The second data storage device includes a second non-transitory computer-readable medium with computer-readable code for instructing the user computing device processor. When the user computing device processor executes the second computer-readable code, the second computer-readable code implements a RIPPL software application ("RIPPL App").

The RIPPL APP perform operations that include interfacing with a global positioning system device ("GPS Device") integrated with the user computing device to obtain the user computing device geolocation data. The RIPPL App then calls a Map Application Programming Interface ("Map API") that interfaces with a map database by utilizing the user computing device geolocation data to obtain map display data. The Map API returns the map display data to the RIPPL App. The user computing device receives the current pool data message from the provider server; and the RIPPL App generates a Live Pool Area Graphical User Interface ("GUI") using the map display data and the profile data from the current pool data message. The Live Pool Area GUI comprises one or more selectable platform user elements that, when selected, display profile data for an associated platform user identifier.

In another feature of the RIPPL App, the RIPPL App can be configured to apply user-selected profile data filter settings to remove the selectable platform user elements from the Live Pool Area GUI that do not meet the profile data filter settings. The RIPPL App can also receive current event data messages containing event data from the provider server and display event data on the Live Pool Area GUI. Another display feature includes the RIPPL App being configured to generate a Profile Display GUI that displays profile data for selected platform user identifiers.

One embodiment of the system includes display of pool areas that can be irregular shaped and determined with reference to a user computing device geographic location. In that case, the determination of whether two platform users are within the same pool area entails the use of algorithms and analysis techniques that determine whether two pool areas, each centered on a different platform user, intersect. In this embodiment, the provider server relational database includes a plurality of platform user identifiers representing platform users. Each platform user identifier is associated with profile data that includes platform user geolocation data and connection data. The relational database further includes pool area data defining a geometric shape with reference to a geographic location (i.e., the location of a platform user).

Continuing with this example embodiment, the provider server performs operations that include receiving a pool data request message transmitted from a user computing device. The pool data request message includes user computing device geolocation data and a PUID. The provider server then determines a user computing device pool area utilizing the pool area data and the user computing device geolocation data. For each platform user identifier, the provider server uses the associated platform user geolocation data to determine whether the platform user is within the user computing device pool area. In other words, the provider server first calculates a pool area specific to a platform user and then determines whether other platform users are within that area.

Next, the provider server generates the current pool data message by first selecting a Pool Population Set-Point number of platform user identifiers within the user computing device pool area. For the Pool Population Set-Point number of platform user identifiers, the provider server retrieves (a) detailed profile data when the connection data indicates a connection to the user computing device PUID, and (b) limited profile data when the connection data does not indicate a connection to the PUID. The provider server generates the current pool data message that includes pool area data and the Pool Population Set-Point number of platform user identifiers and the associated detailed profile data or limited profile data as determined from the connection data. The current pool data message is then transmitted to the user computing device.

In the above example embodiment, the pool area data can include a Pool Radius, and the geographic location can correspond to the user computing device geolocation data. The pool area is, therefore, determined as a circular area extending a distance equal to the Pool Radius from the user computing device. Alternatively, when the relational database includes a pool area associated with each platform user, the step of determining, for each platform user identifier, whether the platform user is within the user computing device pool area, includes determining by the provider server whether platform user pool area and the user computing device pool area overlap.

BRIEF DESCRIPTION OF THE DRAWINGS

These and other features, aspects and advantages of the present invention are better understood when the following detailed description of the invention is read with reference to the accompanying Figures.

FIGS. 3(a)-(h) illustrate example graphical user interface displays for the software platform registration and authentication process.

FIGS. 9(a), 9(b), & 9(c) are example graphical user interface displays illustrating the process for establishing a connection between users.

FIGS. 10(a) and 10(b) are example graphical user interface displays showing the difference between the profile of users that are not connected as friends and users that are connected as friends.

DETAILED DESCRIPTION

Figure 1:
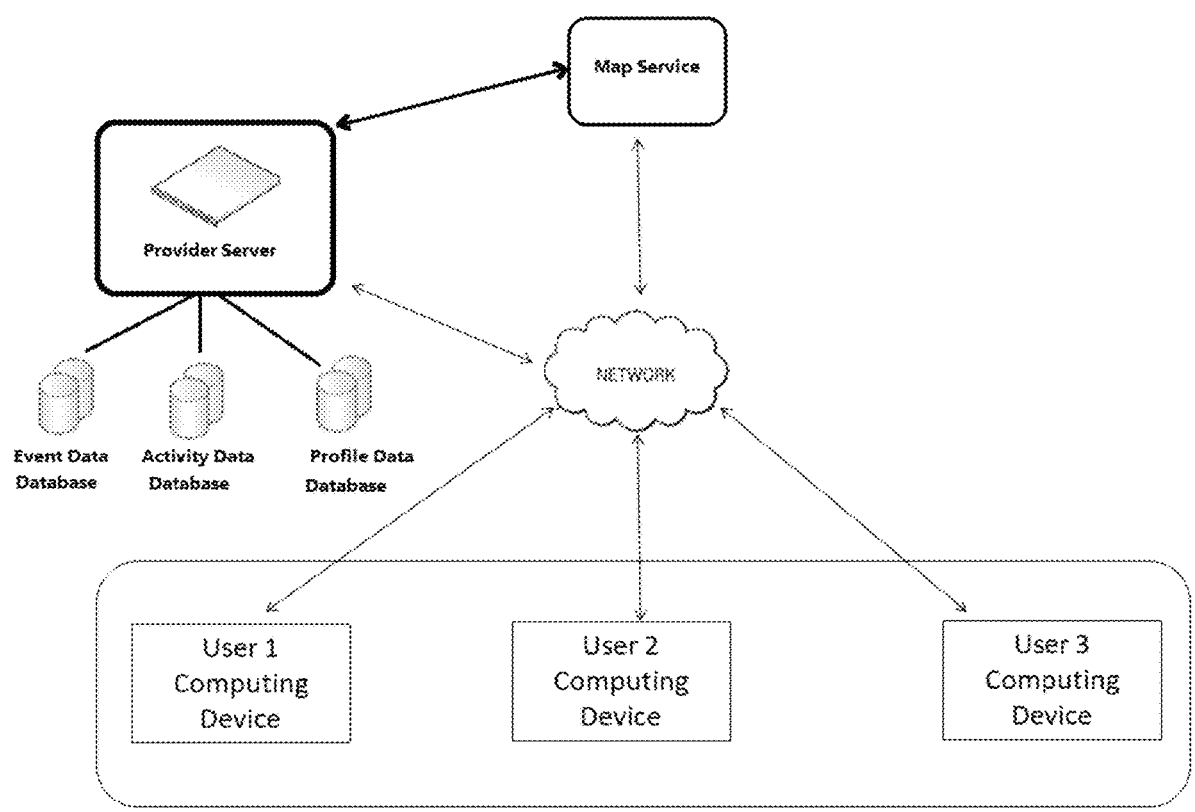
FIG. 1 is an example system diagram according to one embodiment.

The present invention will now be described more fully hereinafter with reference to the accompanying Figures in which example embodiments of the invention are shown. However, the invention may be embodied in many different forms and should not be construed as limited to the representative embodiments set forth herein. The example embodiments are provided so that this disclosure will be both thorough and complete, and will fully convey the scope of the invention and enable one of ordinary skill in the art to make, use and practice the invention. Like reference numbers refer to like elements throughout the various drawings.

It will be understood that relative terms are intended to encompass different orientations or sequences in addition to the orientations and sequences depicted in the drawings and described herein. Relative terminology, such as "substantially" or "about," describe the specified devices, materials, transmissions, steps, parameters, or ranges as well as those that do not materially affect the basic and novel characteristics of the claimed inventions as whole as would be appreciated by one of ordinary skill in the art. The nomenclature utilized to designate various devices and software applications is not intended to be limiting, and reference to a device or application with a particular commercial, proprietary, or other name can be construed to encompass other devices and applications that perform a similar function or have a similar structure.

As used herein, the term provider generally describes the entity providing a software platform and network that enables user interactivity within a defined geographic location called a pool. The terms end user, user, or consumer refer to individuals that utilize the software platform disclosed herein to interact with other users within the dynamically created user device pool. The terms "software application" or "application" are intended to generally refer to end user managed software (e.g., mobile apps, email interface, etc.) as well as software services managed for users and used by software applications (e.g., background software processes that interface with an operating system and various software applications or automated software having no user interface). Software applications may incorporate on one or more software processes or software modules that perform discrete tasks in furtherance of the overall operations performed by a software application. The term "software platform" is used to refer generally to a collection of related software applications, software processes, software modules, and/or software services that perform a multitude of operations and functions directed to accomplishing a related set of objectives.

Turning to FIG. 1, a provider system configuration according to one embodiment includes one or more user computing devices, one or more provider servers, a user profile data database, an event data database, an activity data database, and a third party map service. The various system components are generally implemented by integrated software applications running on one or more physical or virtual computing devices. The computing devices may also utilize software applications that function using resource available through a third-party provider, such as a Software as a Service ("SasS"), Platform as a Service ("PaaS"), or Infrastructure as a Service ("IaaS") provider running on a third-party cloud service computing device.

The embodiment shown in FIG. 1 is not intended to be limiting, and one of ordinary skill in the art will recognize that the system may be implemented using other suitable hardware or software configurations. For instance, the event data and activity data databases can be implemented as one relational database where event data and activity data are stored according to platform user identifiers, such as a Platform User Identifier ("PUID") or other logical categories. As another example, the event data database and activity data database could be integrated with the provider server, or these databases can be configured to reside within a third-party cloud storage service functioning as a SaaS or IaaS provider.

The user computing devices may include a processor that communicates with peripheral subsystems via a bus subsystem. These peripheral subsystems may include a storage subsystem, user-interface input devices (e.g., a touch screen, external physical buttons, a mouse, etc.), user-interface output devices (e.g., a display screen, speakers, etc.), a communication system (e.g., cellular communication, Wi-Fi, Bluetooth), or an integrated geolocation positioning system ("GPS"). By processing instructions stored on one or more storage devices, the processor may perform the steps of the present methods and implement the present systems. Various types of storage device may be used, including non-transitory or transitory optical storage devices, magnetic storage devices, or solid-state storage devices.

The system can utilize GPS elevation data to determine a user computing device elevation, or "height," thereby creating a three-dimensional pool area that can be used to determine user computing device location within a multiple store structure, such as a high-rise condominium or office building. The system can also utilize wireless signal positioning techniques to determine elevation or height. The wireless signal positioning can be implemented using any suitable wireless communication system configured to communicate through radio frequency ("RF"), WI-FI (e.g., wireless local area network products based on the Institute of Electrical and Electronics Engineers 802.11 standards), near field communications ("NFC"), BLUETOOTH®, BLUETOOTH Low Energy ("BLE"), or Ultra-Wide Band ("UWB"). The wireless signal positioning system utilizes a wireless signal received from the user computing device, or utilizes wireless signals transmitted between user computing devices, and determines location and/or elevation using one or a combination of radiolocation techniques. Radiolocation techniques can include, for example, the time difference of arrival ("TDOA") method, the angle of arrival ("AOA") method, the received signal strength indicator ("RSSI") method, the link quality ("LQ") method, or signature-based location methods. Data relating to wireless signal strength, timing of transmission and receipt, angle of arrival, and other useful metrics, can be captured and transmitted to a provider server for use in determining positioning and elevation of user computing devices.

User computing device are implemented as personal computing devices, such as a desktop computer, laptop computer, a cellular smart phone, or tablet computing device. The user computing devices include an integrated software application called the RIPPL software application ("RIPPL App") configured to operate as a user interface and to provide two-way communication with the provider's server. The RIPPL App itself is comprised of multiple software processes or software modules, such as a User Interface Module or Authentication Module. The user computing device software applications, including the RIPPL App, provide graphical user interfaces ("GUIs") that output data and accepts inputs from a user through text boxes, pull-down menus, radio buttons, scroll bars, tactile inputs, or other suitable input functions known to one of skill in the art. Types of data and information processed by the RIPPL App include text data, image data, audio data, video data, among other types of data.

The RIPPL App interfaces with a communication subsystem to provide for a secure connection with other electronic devices. The various computing devices and software applications communicate using a variety possible connections that can include, for example, a local area network, a wide area network, an intranet, an Internet connection, a mobile telephone network, a personal area network, or any other suitable connection.

Registration and Authentication

Figure 2:
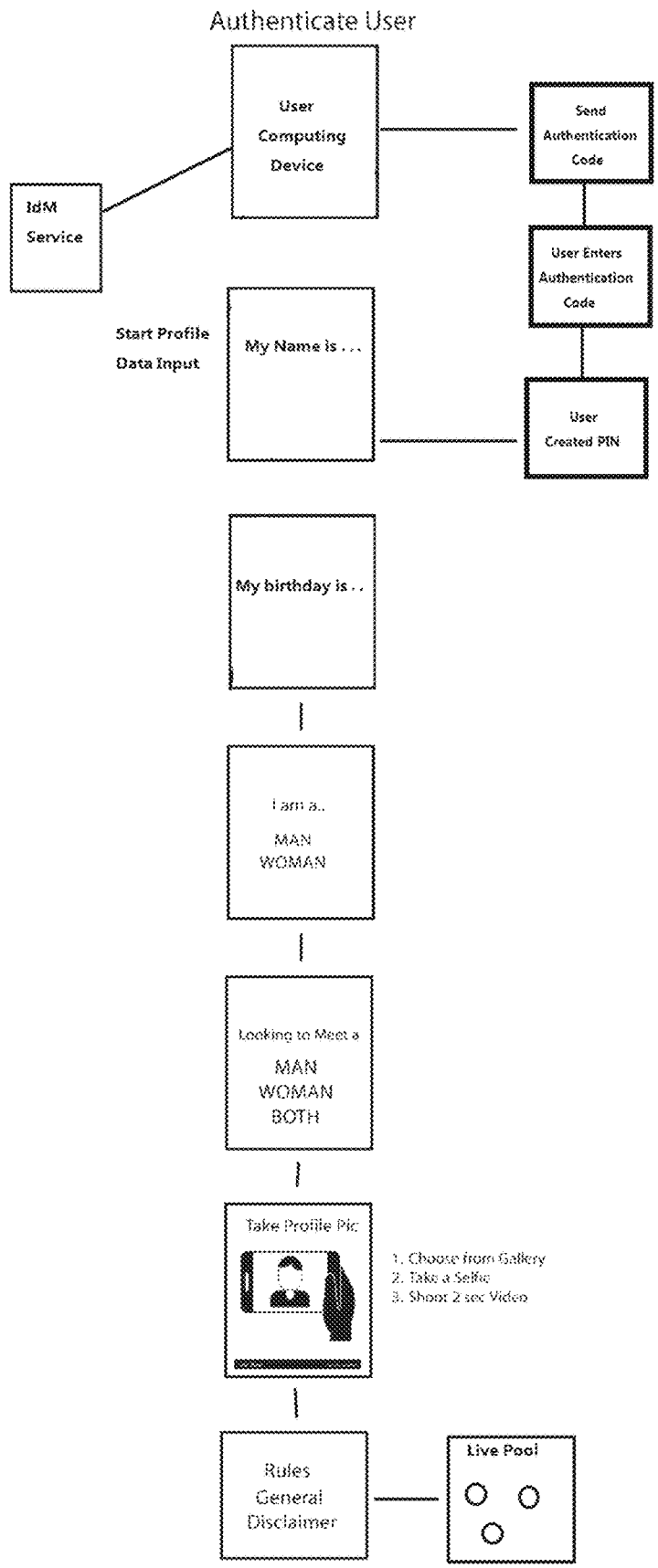
FIG. 2 illustrates an example the software platform registration process.

FIG. 2 illustrates an example process for user authentication and registration with the software platform provider. After downloading and installing the provider's integrated RIPPL software application to the user computing device and initiating the RIPPL App, User Interface Module software code generates a series of Registration GUI display screens, such as the example Registration GUI display screens shown in FIG. 3. Users can be presented with multiple options for authenticating the user's identity. Authentication techniques can include, for instance, authentication utilizing a third-party Identity Management Service ("IdM") or through authentication techniques that transmit a code to the user computing device.

To authenticate utilizing an IdM service account, the user selects the "Register with IdM" function on the display screen of FIG. 3(a). The IdM service is an account that permits authentication of the user's identity and management of user preferences or other information. Types of IdM accounts can include, but are not limited to, social media accounts, email accounts, employer accounts, or cloud storage accounts. Examples of IdM services include Microsoft Azure®, Apple iCloud®, Facebook®, Instagram®, Twitter®, Google®, or other active directory service software. The IdM service can provide information useful for ensuring the security of the transaction, such as biometric data, a personal identification number ("PIN"), gesture recognition information, or federated identification information. The IdM account can also provide relevant profile data, such as the user's name, email address, mailing address, or other data relevant to the registration and authentication process.

Upon selecting the Register with IdM function, Authentication Module software code redirects the user computing device to the third-party IdM service and transmits an authentication request message to the IdM service. The IdM service returns data for displaying a login screen on the user computing device that prompts the user to enter IdM service credential data for authenticating to the IdM service, such as a username, password, or biometric information (e.g., facial recognition, fingerprints). The IdM credential data is transmitted to the IdM service, and the IdM service returns an authentication status message indicating whether the user's identity was successfully authenticated or not as well as relevant profile data.

Users can also be authenticated utilizing an authentication code by, for example, selecting the "Log in with Phone #" function shown in FIG. 3(a) to display the Registration GUI of FIG. 3(b) that prompts the user to enter a phone number. Upon entry of a phone number, the Authentication Module sends an authentication code request message to the provider server. In response, the provider server generates an authentication code that is stored to a database on the provider server. The provider server then initiates transmission of an authentication code text message containing an authentication code to the user computing device associated with the given phone number. Meanwhile, the user selects the "Next" function causing the User Interface Module to render the Registration GUI shown in FIG. 3(c) for accepting input of the authentication code by the user.

The user enters the authentication code in the Registration GUI shown in FIG. 3(c), and selects the "Next" function to transmit the authentication code from the user computing device to the provider server. The provider server compares the received authentication code to the stored authentication code. Entry of the correct authentication code serves as verification that the user is in possession of, and has access to, the user computing device. Those of skill in the art will recognize that the above example is not intended to be limiting, and other verification techniques can be utilized, such as transmitting the authentication code to a user's given email address or initiating an automated call to the given phone number that provides an authentication code utilizing an audio recording. In other embodiments, the authentication code can be used in combination with other authentication techniques, such as the Authentication Module prompting users to enter biometric fingerprint or facial recognition data that is compared against biometric data encrypted and stored to the user computing device to a cloud storage location.

Upon successful authentication, the User Interface Module software code accepts user inputs as profile data that is used to define a user account record in the profile data database. FIGS. 2, 3(d) to 3(h), and 4(a) to (c) illustrate example steps and Registration GUIs utilized in the registration process. The User Interface Module generates sequential Registration GUIs that accept a wide variety of user profile data that includes, but is not limited to: (i) the user's first and last name; (ii) email address; (iii) birthdate; (iv) user-created personal identification number ("PIN"); (v) user gender(s) identifier (e.g., does the user identify as a male or female); (v) a gender match preference; (vi) a profile visual identifier (e.g., a profile picture); (vii) interest identifier data (e.g., hobbies); (viii) wave topic data; (ix) employer data (e.g., name of an employer and job title); (x) education data (e.g., a school currently or previously attended); (xi) residence data (e.g., home town or current city of residence); and (xii) emergency contact data that includes the names, phone numbers, or email addresses of individuals that can be contacted in the event of a serious incident involving the platform user.

The example registration process shown in FIGS. 2-3 illustrates a "One Question per Screen" sign up protocol where new users are walked through a short series of questions to facilitate user engagement during the registration process and encourage candid responses. The user-created PIN is utilized to authenticate the user into the software platform during subsequent uses of the RIPPL App following completion of the registration process. That is, on launching the RIPPL App, the user is prompted to enter the PIN that is then transmitted to the provider server and compared against a stored PIN in the profile data database record entry for the particular user. If the entered PIN and the stored PIN match, the user is authenticated to the platform. Utilization of the PIN authentication method provides a more streamline authentication technique over conventional username and password requirements while still providing sufficient security. Those of skill in the art will recognize that the above examples are not intended to be limiting, and other embodiments of the software platform can utilize conventional user name and password authentication techniques as well as account registration interfaces that accept multiple categories of profile data on a single display screen.

As illustrated in FIG. 3(g), users can select up to five profile visual identifiers (i.e., pictures or videos). Users can create a profile visual identifier by taking a "selfie" photograph or creating a short (e.g., two second) video with the user computing device integrated camera or video recorder. Alternatively, users can select an existing photograph stored to the user computing device or to a cloud storage location. Users can also utilize the "Ask Me About" GUI display screen of FIG. 3(h) to enter wave topic data, which can be one or more topics to be addressed during a wave messaging communication session. As explained more fully below, a wave messaging communication session can represent an initial interaction between two users, and the wave topic data facilitates this interaction by providing topics to be addressed as part of the wave messaging communication session. After profile data is entered, the User Interface Module can generate a GUI display screen that provides users with data concerning rules for using the application or disclaimers that promote user safety, security, tolerance, inclusion and positive interaction between users.

Figures 4A, 4B, 4C:
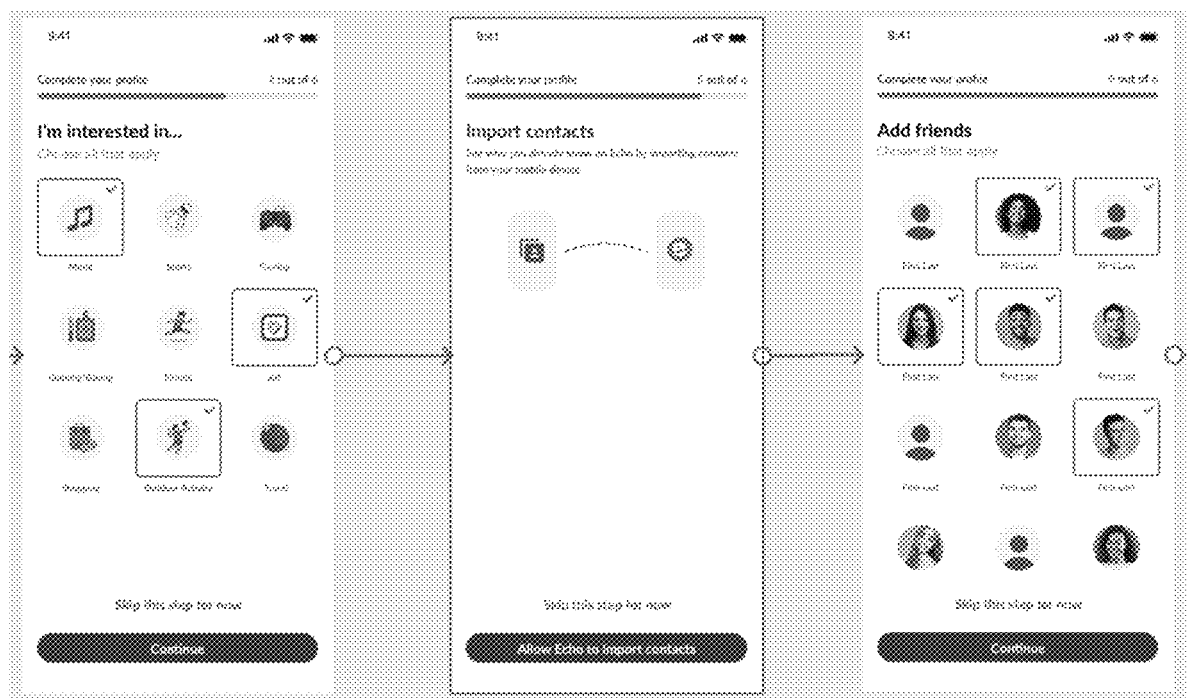
FIGS. 4(a), 4(b), and 4(c) illustrate example graphical user interface displays for the software platform registration process

As opposed to text data inputs, the account registration process can also utilize graphical inputs that allow users to select from a discrete number of options represented as images or icons, such as the example Registration GUIs shown in FIGS. 4(a) to 4(c). In FIG. 4(a), users are provided an option to enter interest identifier data by selecting from one or more images or icons representing potential hobbies and interests, such as music, sports, video games, or fitness activities, among others. Utilizing a graphical approach further enhances user engagement. And limiting selections to discrete categories allows the RIPPL software platform to more efficiently categorize user information, such as profile data, which can enhance user experience by enabling the software platform to make targeted recommendations for promotions, user groups, potential friend or other connections, or other categories.

The Registration GUIs shown in 5(b) and (c) illustrate that users can also be provided the option to import contacts from personal contact data stored to the user computing device or an IdM service so that users can send connection invites, as described in more detail below. The personal contact data is transmitted to the provider server, and the provider server searches the profile data database for platform users that match the personal contact data. The provider server returns an add friends message to the user computing device that includes a list of platform user identifiers and corresponding profile data that correspond to the user's personal contact data. The User Interface Module renders an Add Friends GUI such as the interface shown in FIG. 4(c) that allows the graphical selection of platform users to receive a connect invitation message. This feature enables new users to immediately engage with existing platform users and streamlines the registration and setup process. In some embodiments, the Add Friends GUI can also include a function that sends messages to non-platform users via email or text message that includes a link or invitation to join the RIPPL software platform by creating a new account.

User Profiles and Connections

Once the registration process is complete, the User Interface Module can generate a Live Pool Area GUI that allows users to immediately begin experiencing the pool area, as explained more fully below. The RIPPL App periodically (e.g., every 30 seconds, 5 minutes, etc.) captures geographic location data from the integrated GPS hardware of the user computing device and transmits the geographic location data to the provider sever. The provider server utilizes the geographic location data to set a pool indicator to "in pool" or "off pool" representing whether the user computing device is within a pool area and available. The provider server stores the geographic location data, the pool indicator, and a pool area identifier to a database record on the profile data database as part of a database record associated with a particular platform user. In this manner, the provider server can generate and store up-to-date data concerning whether a user computing device is within a pool area, and if so, where the pool area is located.

Figure 5:
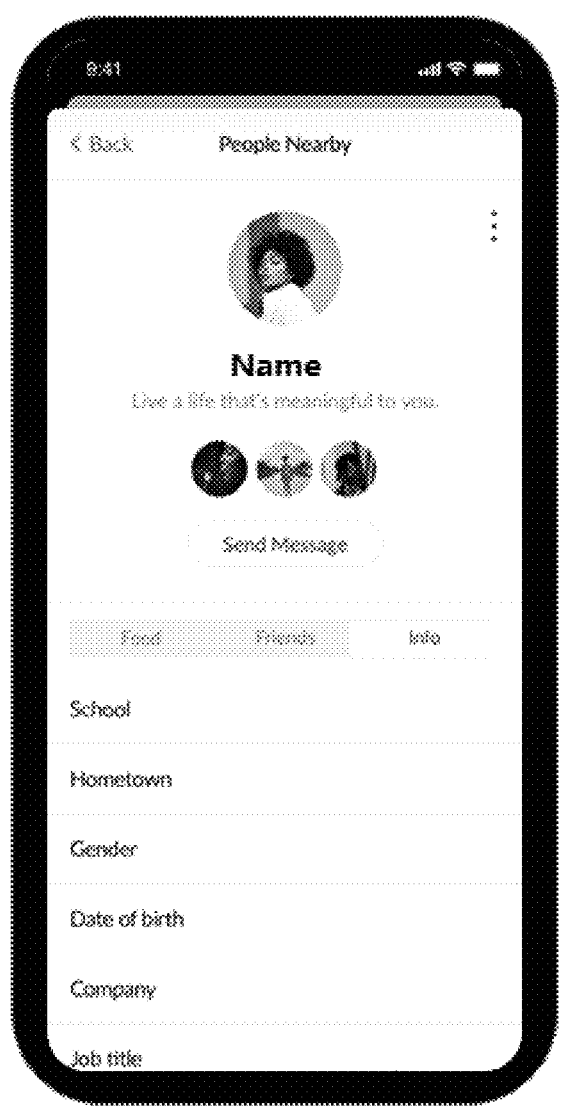
FIG. 5 is an example graphical user interface displaying user profile data.

The user profile data is transmitted from the user computing device to the provider server and stored to the profile data database as a list record associated with a global user identifier for that user, such as a unique user name for each particular user. During use of the software platform, when a user attempts to access the user's own or another platform user's profile data, the User Interface Module transmits a profile data request message to the provider server that includes the platform user identifier for the target user. The provider server utilizes the platform user identifier to access and return associated profile data to the User Interface Module. The User Interface Module uses the received profile data to generate a user Profile Display GUI, such as the example Profile Display GUI shown in FIG. 5. The Profile Display GUI can show profile data for the current user of the user computing device or for other users of the software platform.

Figure 6A:
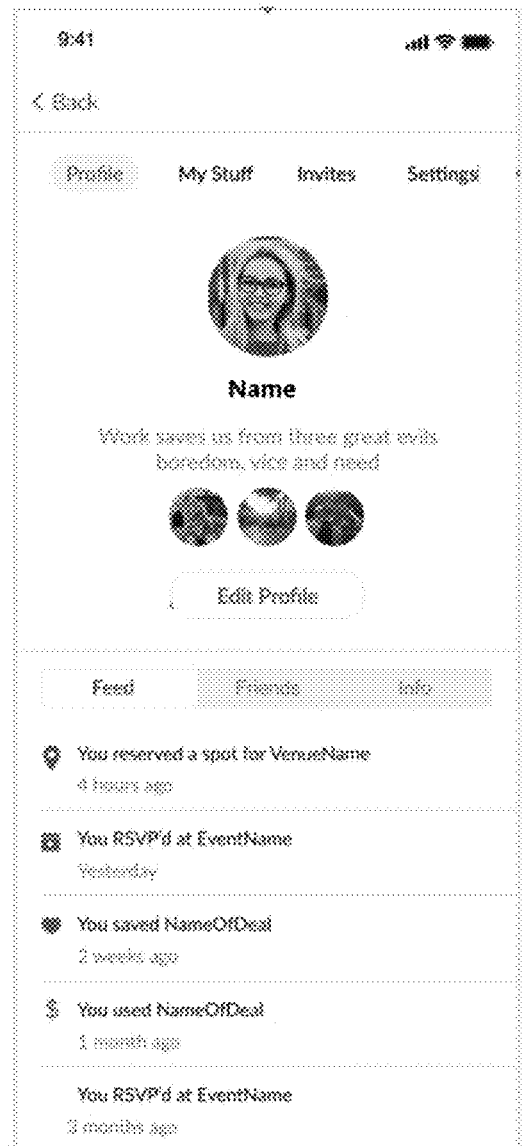
FIG. 6(a) is an example graphical user interface display showing a user activity feed.
Figure 6B:
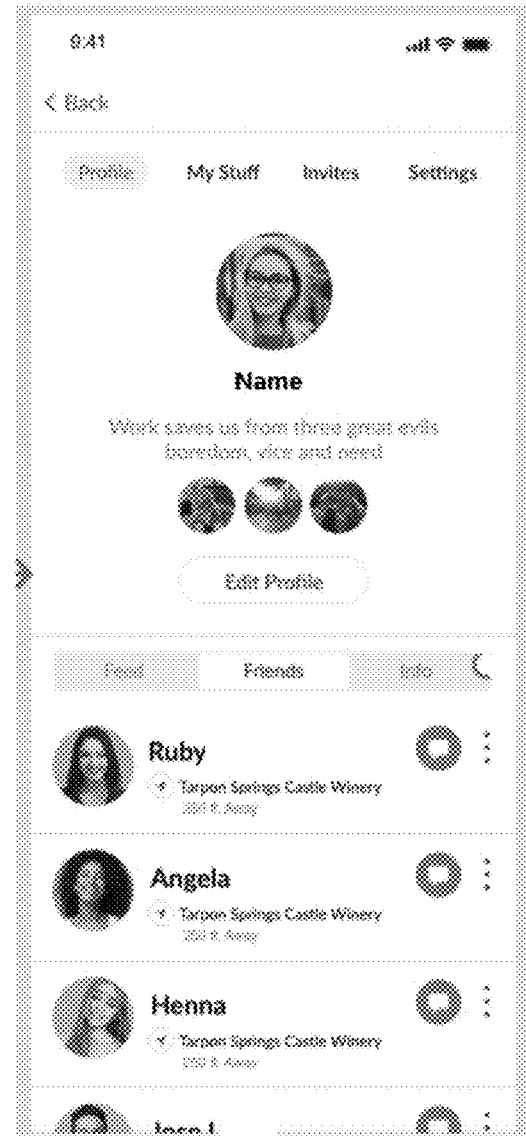
FIG. 6(b) is an example graphical user interface display showing a list of connected friends.

The Profile Display GUI can include one or more "tabs" that are function inputs used to toggle between the display of profile data (selection of the "Info" tab), user activity data (i.e., selection of the "Feed" tab), or user connections data (i.e., selection of the "Friends" tab). Selection of the Feed tab and the Friends tab is illustrated in FIGS. 6(a) and 6(b) and respectively. Selection of the Feed tab results in the user computing device transmitting to the provider server a user activity data request message that includes a platform user identifier for the platform user that is the subject of the Profile Display GUI. The provider server accesses the activity data database and returns to the user computing device a current user activity data message containing activity data relating to the subject user. The User Interface Module displays activity data for the particular platform user on the Profile Display GUI shown in FIG. 6(a) that includes information such as locations visited or events attended by the platform user. Similarly, selection of the Friends tab causes the user computing device to transmit a user connection data request message to the provider server that includes a subject user platform user identifier. The provider server obtains connection data from the profile data database and returns a current user connection data message containing connection data relating to the subject user that is displayed in the Profile Display GUI of FIG. 6(b) in a list format. The connection data represents a list of platform users that have authorized a friend connection within the RIPPL software platform.

Significantly, the RIPPL software platform allows platform users to control various settings relating to privacy and security. First, users select the Settings function on the Profile Display GUI, which results in the User Interface Module generating the Settings GUI shown in FIG. 7. From the Settings GUI, platform users can alter settings that include: (i) enabling or disabling the display of notifications transmitted by the provider server (i.e., "Push Notifications); (ii) enabling or disabling the RIPPL App from retrieving geolocation data from the GPS hardware integrated with the user computing device; (iii) enabling or disabling the RIPPL App from accessing personal contact data (i.e., Sync contacts); and (iv) selecting a category of platform users that can view a user's profile data, geolocation data, or "Feed" activity data, such as permitting display of such data to only connected users (i.e., selecting the "Friends Only" function button), to all Platform users (i.e., "Everyone"), or to no platform users at all (i.e., "Keep Private"). The settings selected on the Settings GUI are formatted as privacy settings data and transmitted to the provider server for storage in a relational database.

Figure 7:
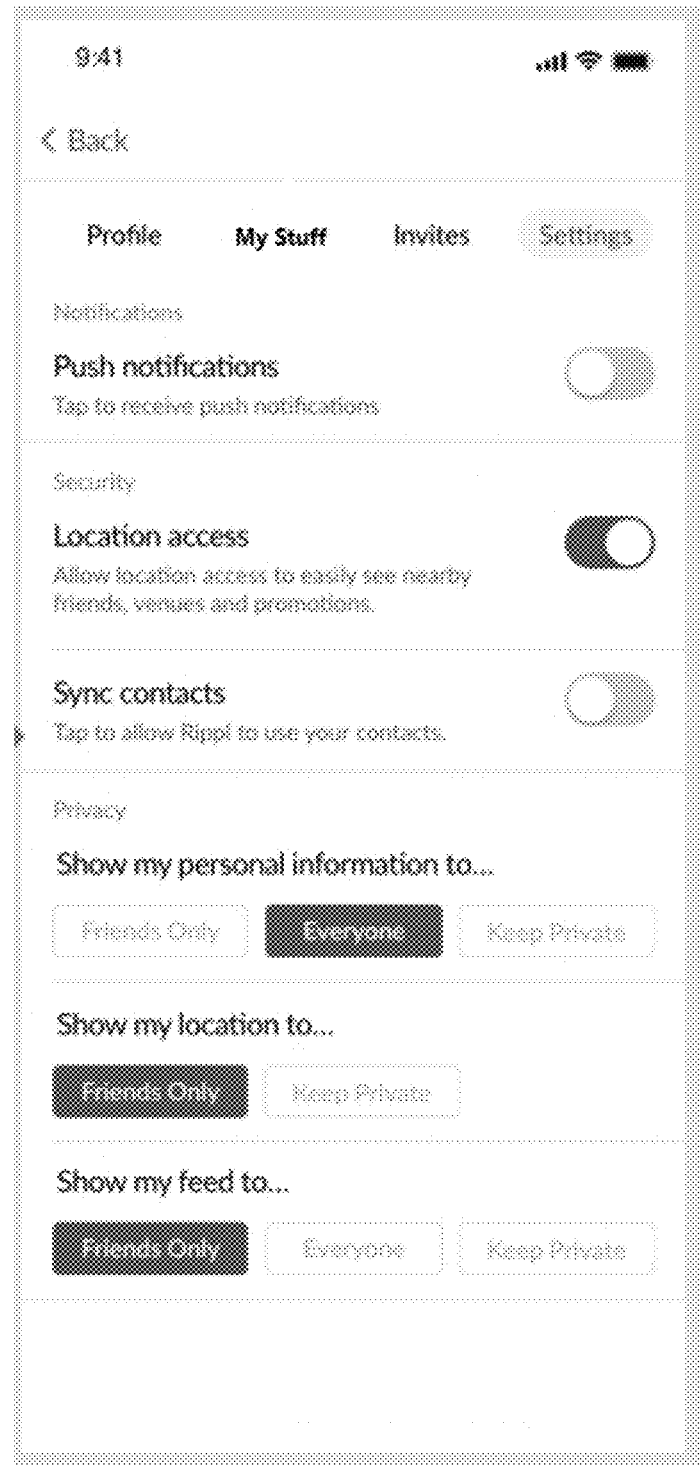
FIG. 7 is an example graphical user interface display for configuring settings.
Figure 8:
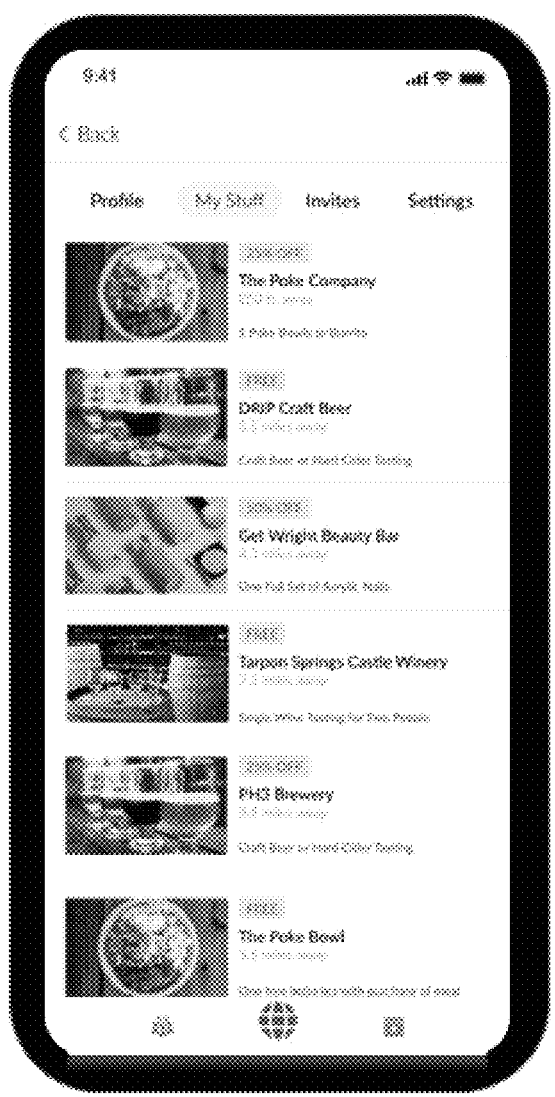
FIG. 8 is an example graphical user interface display for user-saved promotional and other data.

Selecting the My Stuff function on the Profile Display GUI results in the User Interface Module generating the My Stuff GUI depicted in FIG. 8. The My Stuff GUI lists promotional deals selected by the platform user and available through the RIPPL software platform, such as coupons offered by retailers for discounts consumer goods, food, or beverages. Selection of promotional deals can be stored by the provider server as activity data and optionally transmitted to user computing devices for display as part of the activity data "Feed" illustrated in FIGS. 6(a) and 12 according to the user-defined settings shown in FIG. 7. Platform users are thereby given an opportunity to engage one another by utilizing the same promotional deals with other platform users that share the same interest, such as visiting the same restaurant or retailer.

The Profile Display GUI can vary according to the type of connection, if any, between the user viewing the profile page and the user that is the subject of the profile page. That is, if two users are connected as "friends," then various expanded permissions will apply to communications and data exchanged between, or relating to, the two users. A requesting user may initiate a connect invitation message by, for example, selecting the Send Friend Request function shown on the Profile Display GUI of FIG. 9(a). The connect invitation message includes a target user PUID and is transmitted to the provider server for routing to the target user who can "Accept" or "Ignore" the connect invitation message, as depicted in FIG. 9(b). Confirming the connect invitation message, as illustrated in FIG. 9(c), generates connection data establishing the requesting user and the target user as "friends" within the RIPPL software platform. The user connection data is stored as profile data to the list record for the respective users within the profile data database.

The RIPPL App can obtain user connection data from the provider server at the time the RIPPL App is launched, and the user connection data is then stored to a database on the user computing device for use by the User Interface Module. Alternatively, the User Interface Module can request user connection data in real time as needed. For instance, upon receipt of a profile data request message, the provider server can access the profile data database to check for user connection data that is utilized to determine whether the requesting user and target user have an established connection. If not, the provider server is configured to return a limited subset of "limited profile data" to the requesting user computing device, such as only target user's first name, visual profile identifier, or wave topic data. On the other hand, if the requesting user and the target user have an established connection, the provider server returns a larger subset or all available "detailed profile data" for the target user, including first and last names, current city of residence, or current geolocation, among other examples. Similarly, varying permission can apply to the display of activity data on the "Feed" where activity data is not displayed if users are not connected but is displayed if users are connected. FIG. 10(a) illustrates the appearance of a Profile Display GUI for users that are not connected versus users that are connected as friends shown in FIG. 10(b).

The foregoing illustrates that the profile data displayed on the Profile Display GUI can vary according to the existence of a connection between users and according to the settings depicted in FIG. 7. Users can, therefore, have a public Profile Display GUI accessible to a broader range of platform users as well as a private Profile Display GUI accessible only to selected platform users. This has the advantage of providing security and privacy for platform users. It should be appreciated that other types of user connections could be utilized with varying levels of permissions. For instance, a third connection category and related permissions could apply to users that are not connected as friends but that are members of the same group of users, such as a groups of users according to school attended, current employer, or shared interests.

User Messaging and Activity Data

The Profile Display GUI can include other functions, such as the "Send Message" function shown in FIG. 6. The Send Message function allows users to initiate a user chat message sent from the user viewing the Profile Display GUI to the user that is the subject of the Profile Display GUI. User chat messages are sent between and among user computing devices through the provider server and can include message content data such as text data as well as audio visual data depending on the applicable permissions. Selecting the Send Message function causes the User Interface Module to generate a Chat GUI. The Chat GUI can include a chat communication session interface that displays user chat messages exchanged between individual platform users or groups of users along with functions for initiating new user chat messages. The Chat GUI can additionally include a chat communication session list interface that displays a list of prior chat communication sessions, such as the display interface shown in FIG. 11.

Figure 11:
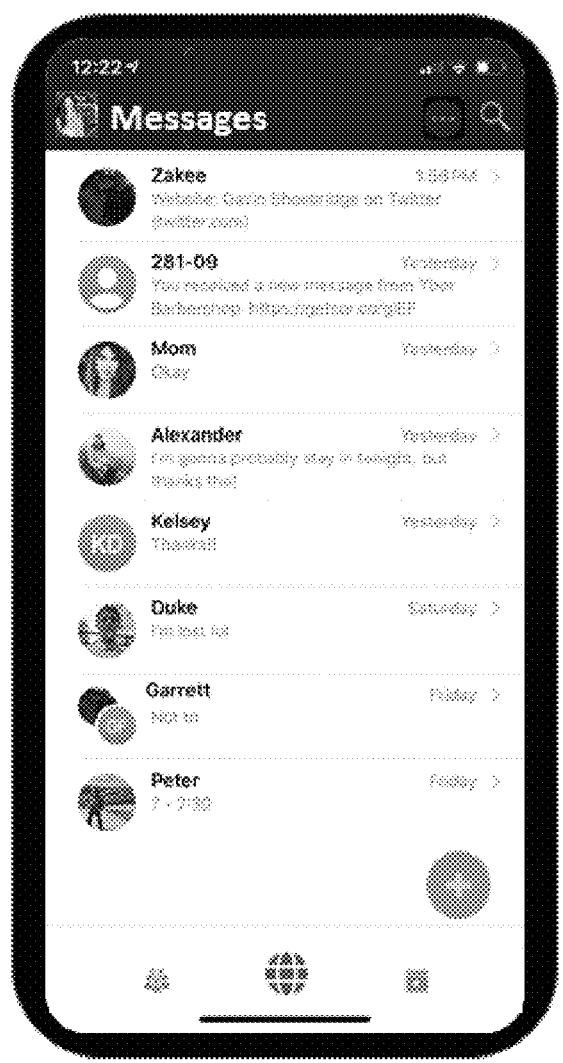
FIG. 11 is an example graphical user interface display for exchanging messages between and among users.

A user initiates a user chat message by selecting a recipient user from the list shown in FIG. 11 or selecting the New Message function shown as a (+) icon in FIG. 11. When initiating a user chat message, or when generating the Chat GUI, the User Interface Module accesses connection data from a database on the user computing device, or alternatively, sends a permissions request message to the provider server. On receipt of a permission request message, the provider server accesses the profile data database to determine whether the chat message sender and the intended chat message recipient are connected as friends or as some other category of connection. The provider server returns a permissions status message that includes connection data indicating the type of connection (if any) between the chat message sender and the intended chat message recipient.

The Chat GUI utilizes connection data to establish permissions during chat message communication sessions. The permissions associated with user chat messages can vary depending on the existence and type of connection between users. For instance, if users are connected as friends, the Chat GUI can be configured to permit users to exchange text data, pictures, and video data whereas if the users are not friends, the Chat GUI limits the content exchanged to text data.

Figure 12:
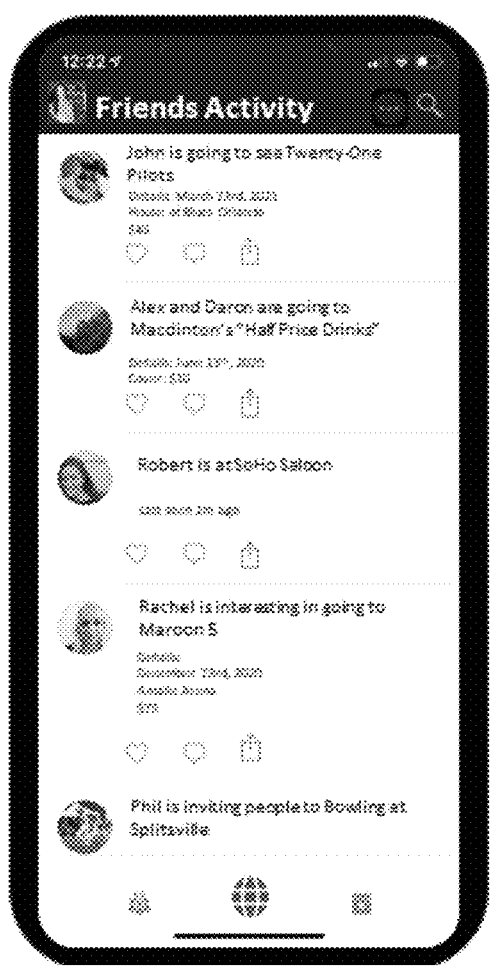
FIG. 12 is an example graphical user interface display showing user activity.

Activity data for connected users can be displayed on a Friends Activity GUI display screen, such as the example interface shown in FIG. 12. In generating the Friends Activity GUI, the User Interface Module first transmits a user activity data request message to the provider server. The provider server accesses the profile data database record for the requesting user to obtain connection data for the requesting user. The connection data is used to determine platform user identifiers for the platform users that are connected as friends (or otherwise) to the requesting user. The provider server utilizes the platform user identifiers for connected users to retrieve activity data from the activity data database for connected users. The provider server transmits the activity data to the requesting user computing device within a current activity data message.

Activity data can be stored to the activity data database as discrete database record entries according to a time stamp when the activity occurred and the associated platform user identifier. To facilitate efficient use of network bandwidth, the current activity data message can be configured to include a limited number of activity data database record entries. As a user "scrolls" through the activity data displayed on the Friends Activity GUI of FIG. 12, the user computing device can transmit supplemental activity data request messages to the provider server to obtain additional activity data for display. The platform can be configured so that activity data database record entries are not transmitted multiple time to the same user computing device by, for instance, tracking what activity data was previously sent, or by including time stamp data or other filter criteria data in the supplemental activity data request messages that causes the provider server to return only activity data meeting the time stamp or other criteria (i.e., all activity data occurring before or after a given time). The RIPPL App can also include an integrated activity data Polling software process that periodically transmits an updated activity data request message to the provider server such that the provider server returns activity data generated subsequent to the last activity data request, thereby ensuring that users routinely receive updated activity data.

Activity data can include, for instance: (i) the identity of platform users that are currently interacting and/or within the same geographic location (e.g., the names of users at a particular restaurant); (ii) an identifier and/or location data for a commercial or recreational establishment visited by a platform user (e.g., a restaurant, salon, etc.); (iii) identifiers and/or location data associated with an event or commercial or recreational activity in which a platform user participated (e.g., the name of a musical group that performed a concert attended by the platform user as well as the name of the venue, or an identifier and location for a sporting event); (iv) promotional opportunities that platform users have saved, marked, or redeemed (e.g., the platform user has saved a coupon and is expected to, or is currently, visiting a restaurant or business to utilize the coupon); (v) personal events or status for platform users (e.g., a platform user that just got engaged at a given location or that is satisfied with the user's experience shopping at a business location); (vi) or other relevant data defining a platform user's activities.

Activity data can be generated and transmitted to the provider server automatically. For instance, if a platform user selects or redeems a promotion from the My Stuff GUI, the user computing device transmits data representing the selection or redemption to the provider server as activity data. Prior to transmission to the provider server, the RIPPL App can generate a notification asking the user for authorization to make the activity data publicly available through display on the Friends Activity GUI of other platform users as well as the desired permissions level (e.g., Friends Only, Everyone, etc.). The activity data is then transmitted to the provider server with authorization data and permissions data indicating whether the activity data is to be publicly available (or not) and to whom. Thus, platform users have a convenient mechanism for sharing their activity or maintaining privacy.

In other embodiments, the provider server can include an Activity Monitor software process that analyzes incoming data received from user computing devices to generate activity data. To illustrate with a simplified example, the Activity Monitor process can check user computing device geolocation data against the known time and location of events as stored in the event data database. If a user computing device geolocation data shows the device is proximal to a known event, the provider server can transmit an activity verification message to the user computing device to prompt the RIPPL App to generate a notification asking the user to verify whether the user is attending the corresponding event.

In yet other embodiments, the RIPPL App can include input options that allow users to affirmatively generate activity data. For instance, users can download and view event data from the provider server and mark themselves as "interested in attending" or "currently attending" an event, which is transmitted to the provider server as activity data.

The RIPPL App can be configured to generate a notification asking the user for authorization to make the activity data available for display on the Friends Activity GUI as well as the desired permissions level that is transmitted to the provider server as authorization data and permission data along with the corresponding activity data.

User Device Pool Areas

Figure 13:
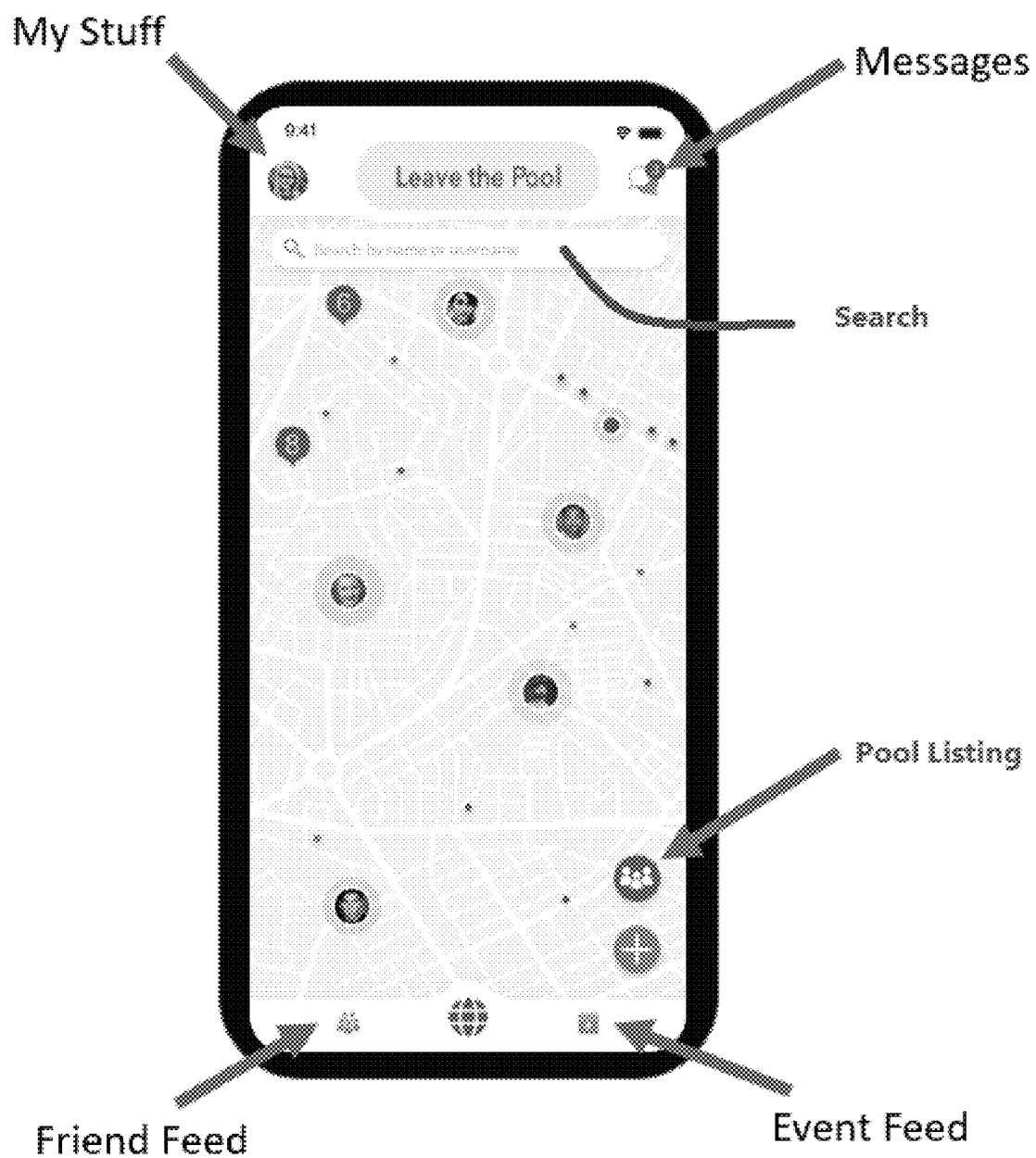
FIG. 13 is an example graphical user interface display for a pool area.

Turning to FIG. 13, the Live Pool Area GUI is shown as a map with color-coded markers, or selectable platform user elements, that indicate the location of friends, events, and the presence of other platform users within the pool. For instance, friends can be shown in blue with associated profile visual identifier data, platform users that are not connected as friends are shown as a purple circle or dot, and available event data is shown as a marker or tag having an associated event identification number. The Live Pool Area GUI can further display other relevant profile data, activity data, or event data, such as changing the color coding for events that are in progress or for platform users that might be deemed inactive as determined from the time elapsed since the provider server last received activity data or a change in geolocation data. Users can filter the other platform user elements displayed in the pool area according to various profile data categories, such as selecting for display only platform user elements that represent platform users associated with a particular school, platform users from a particular age group range, or platform users that have selected interests, among other categories.

To generate the Live Pool Area GUI, the User Interface Module calls an integrated Map Application Programming Interface ("API") that interfaces with a third party map database to retrieve map data used by the User Interface Module to generate the map displayed as part of the Live Pool Area GUI. The user computing device sends a pool data request message to the provider server that includes user device geographic location data and a platform user identifier. The pool data request message can be transmitted upon opening the Live Pool Area GUI on the user computing device, or it can be sent when the user selects a function to enable the pool feature on the user computing device.

The provider server receives the pool data request message and compares the user computing device geographic location data against one or more predefined pool areas stored to the provider server. Based on the comparison, the provider server determines whether the user computing device is located within a pool area or not and sets the pool indicator to a first value of "in pool" or a second value of "off pool." If the user computing device is within the pool area, the provider server also determines an identifier and geolocation for the pool area. That is, there could be a multitude of predefined pool areas each with a unique identifier and geolocation.

If a user desires to leave the pool, the user can select the "Leave the Pool" function shown in FIG. 13 or physically leave the geographic pool area with the user computing device. To enhance privacy and security, platform users within a pool area can elect to limit profile data available to other platform user's within a pool. For example, the Settings GUI of FIG. 7 optionally includes selections that prevent a user's profile visual identifier data or name from being visible to other platform users in the pool area and/or that prevents communication with other users in the pool area. To apply the privacy settings, the provider server retrieves stored privacy data from the profile data database for selected platform users. The privacy data is applied to filter out desired categories of privacy data before the provider server generates a current pool data message comprising profile data that is transmitted to the user computing devices. Once comfortable within the pool area, the user can remove the restrictive privacy settings, thereby allowing the display of additional profile data and permitting communication with other users.

If the user computing device is not located within the pool area, the provider server accesses the profile data database record for the requesting user or for other platform users in the pool to obtain connection data. The connection data is utilized to determine platform user identifiers for the platform users that are connected as friends (or otherwise) to the requesting platform user identifier. The provider server utilizes the platform user identifiers for connected users to access the profile data database to retrieve profile data for connected users that have a geographic location proximal to the requesting user such that the connected users would be within the area represented by the map data.

After processing the pool data request message for a user computing device that is not within a pool area, the provider server transmits a current pool data message to the user computing device that includes: (i) pool area data; (ii) detailed profile data that incorporates geolocation data for platform users that are connected to the requesting user; or (iii) event data corresponding to geographic locations within the area represented by the map data. The data from the current pool data message is used by the User Interface Module to generate the Live Pool Area GUI. In particular, the geolocation data can be used to display the location of connected platform users on the Live Pool Area GUI and to display a distance between users. Notably, for a requesting user computing device that is not within the pool area, the provider server will not return profile data, activity data, geolocation data, or other data relating to platform users that are not connected to the requesting user as friends. Thus, when a user computing device is not within the pool area, the user can view only information relating to friends or other connected platform users.

If the user computing device is within a pool area, the provider server will access the profile data database and determine platform users that have a pool indicator and pool identifier indicating the users are within the same pool as the requesting user—regardless of whether the users are connected as friends or otherwise. The provider server sends the requesting user computing device a current pool data message that includes: (i) pool area data; (ii) limited profile data for platform users that are within the same pool but are not connected to the requesting user; (iii) detailed profile data for connected users (including geolocation data); and (iv) event data.

When a user computing device is within a pool, the provider server transmits detailed and/or limited profile data to the user computing device for a predetermined number of randomly selected platform users (i.e., a Pool Population Set-Point), such as profile data for forty (40) platform users that might or might not connected as friends (or another type of connection) to the requesting user. In this manner, a user's permission to interact with platform users other than friends is restricted unless a user is physically located within the geographic pool area. The provider server will determine those platform user identifiers associated with a pool indicator having a first value of "in pool." The provider server will select a Pool Population Set-Point number of platform user identifiers and store the platform user identifiers to a relational database as a Current Pool Population database list representing those platform user identifiers that are within the pool and selected for display on a user computing device Live Pool Area GUI.

The pool area data can be used to display the pool area on the map of the Live Pool Area GUI. The User Interface Module can limit display of the map on the Live Pool Area GUI to only the pool area, or the pool area data can be used to demarcated the pool area on the map with boundary lines or as a shaded region on the map. The pool area can be a predefined geographic area comprising a multitude of connected geographic points where the geographic points are defined by the provider. In some embodiments, the pool area is defined with reference to a predefined geographic area corresponding to known political or other boundaries, such as a zip code, city boundaries, county boundary, neighborhood boundaries (e.g., Tribeca, SoHo, or Harlem in New York City), or a private property line.

A Pool Polling software process integrated with the RIPPL App can periodically transmit a pool data update request message to the provider server that requests updated data for display on the Live Pool Area GUI. On receipt of a pool data update request message, the provider server again accesses the profile data database to identify platform users that have a pool indicator and pool identifier establishing that the platform users are within the same pool as the requesting user. The provide server compares the most recent profile data (including pool indicators) against profile data previously sent to the user computing device to determine whether platform users have exited the pool area since the last current pool data messages was sent to the user computing device. If users have left the pool area, the provider server removes the missing platform profile identifier(s) from the Current Pool Population, selects platform user identifiers to replace those that have left the pool area, and stores the replacement platform user identifiers to the Current Pool Population database list. Profile data for the selected "replacement" platform users is transmitted by the provider server to the user computing device as part of an updated pool data message or a current pool data message.

As opposed to other platforms that permit unabated remote contact that might not be welcome at the time, the inventive platform disclosed herein has the advantage of limiting contact from users other than friends until a user enters the pool area. Thus, undesired contacts are limited. At the same time, users that desire interaction with "new" people (i.e., platform users other than friends) are encouraged to physically visit the pool area location and interact in person rather than continue engaging in remote interactions. A further advantage is that encouraging in-person interaction mitigates against the risk of interactions with platform users that have created profiles using false data in a phenomenon known in the United States as "catfishing." The feature whereby the provider server randomly selects a limited Pool Population Set-Point number of platform users to display within a pool encourages platform users to continually interact with new users that have not previously appeared in a requesting user's pool. Moreover, this feature provides a measure of security as platform users are difficult or impossible to track over time given that the same users do not consistently appear in a requesting user's pool area.

With respect to the pool area, alternative embodiments of the platform can generate pool areas as perimeters around a platform user's geographic location, such as circular area within 500 or 1,000 feet of a given user computing device (the "Pool Radius"). In yet other embodiments, the pool area is defined with reference to a non-circular area surrounding the user computing device, such as a rectangular area, square area, or a combination of areas such as the representative pool area shown in FIG. 14. In this embodiment, platform users establish a pool area by using the RIPPL App to select a "Join Pool" function that enables or disables the pool feature. When the pool feature is enabled, the user computing device transmits a pool data request message to the provider server that includes geolocation data for the user computing device as well as a pool indicator set to "enabled."

Figure 14:
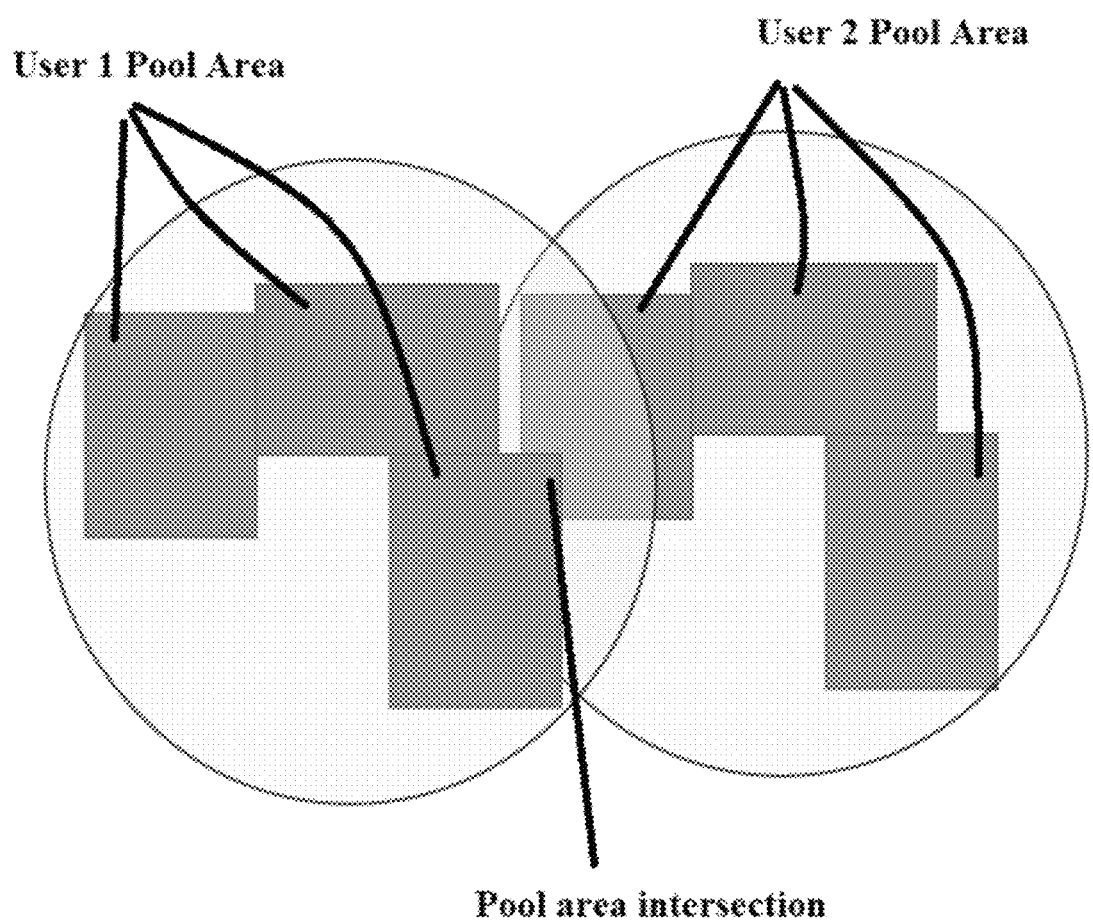
FIG. 14 illustrates calculation of irregular pool areas.

The provider server utilizes the received geolocation data to search the profile data database for platform users within the Pool Radius or other geographic area. With some techniques, the provider server can determine whether there is overlap between the predefined pool areas of two user computing devices with the overlap being construed as a positive indication that two users are within one another's pool. The results of an example calculation are shown in FIG. 14, where two non-standard pool areas are shown as an overlap between the rectangular areas, or the overlap of two standard pool areas is shown by the overlap of the two circles.

Determining overlap of pool areas can be understood with the following simplified example where, for instance, if the provider server takes the map to be a set of two dimensional coordinates, the "northern" most coordinate of a first user's pool area can be checked against the values for a second user's "southern" most pool area coordinates. If the second pool area has a southern-most coordinate that is higher than the northern-most coordinate for the first pool area, the provider server will mark the two areas as not overlapping. Otherwise, if the southern-most and northern-most coordinates correspond, the eastern-most and western-most boundaries are checked in a similar fashion to ascertain the possibility of overlap.

If it is determined that the pool areas overlap or one user is within the pool area of a second, then the provider server then randomly selects a Pool Population Set-Point number of platform users whose profile data is transmitted to the user computing device as part of a current pool data message along with map data and event data as described above. Users can exit the pool area by, for instance, selecting the "Leave the Pool" function shown in FIG. 13.

For embodiments where the pool area is defined as being determined with reference to a user computing device location, the geographic boundaries of the pool area itself will change dynamically with the movement of the user computing device. In this case, each user pool area is stored to the provider database with a distinct pool identifier and corresponding geographic pool area data.

In addition to two-dimensional techniques, the pool area can be determined with reference to three-dimensional techniques that utilize elevation data received from the user computing device GPS system or positioning data determined using wireless signal positioning techniques. In all cases, use of geolocation data allows the system to ascertain whether platform users are within a pool area regardless of a platform user's height or elevation. Use of the elevation or wireless positioning data further permits the system to determine, disseminate, and display a relative vertical distance or elevation between users by, for example, including elevation data or positioning data in the current pool area message transmitted by the provider server to a user computing device. The result is a three-dimensional pool area that allows a first platform user to see whether a second platform user is at the same geolocation but located one or more floors above, or one or more floors below, the first platform user within a multiple story structure. In some embodiments, the pool area can be defined with reference to an elevation, such as defining the first five stories of a building to fall within a pool area while the next five stores (i.e., sixth to tenth stories) fall outside of the pool area.

Figure 15:
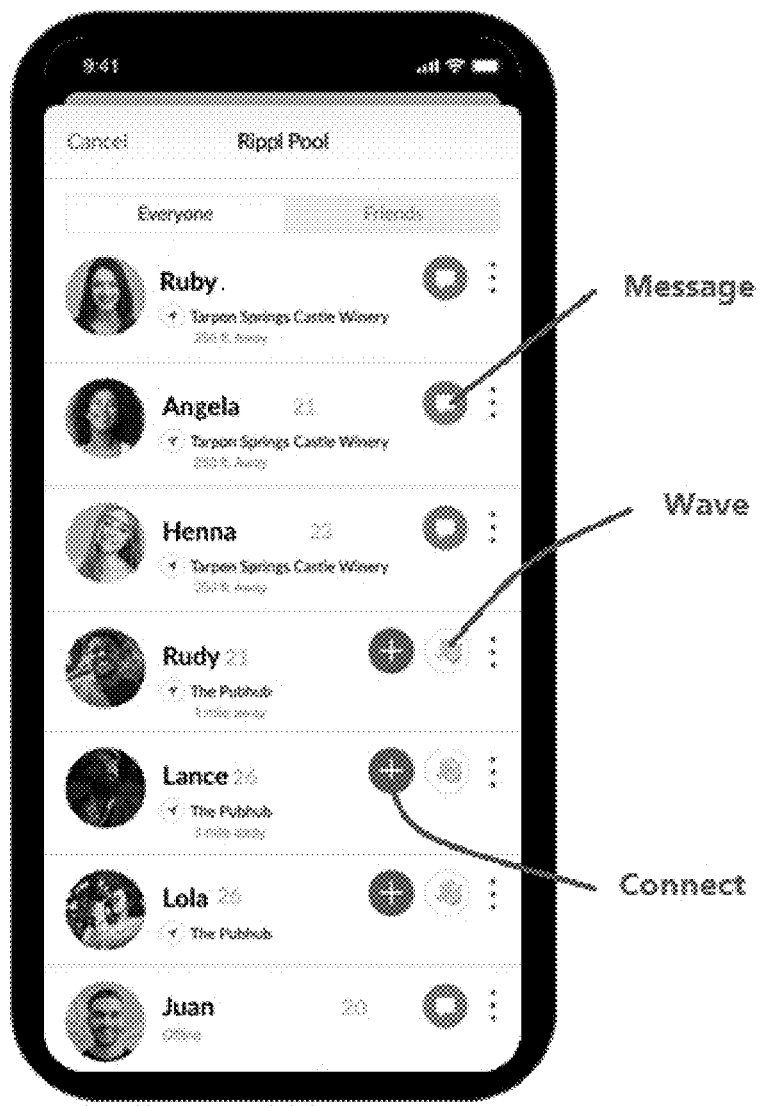
FIG. 15 is an example graphical user interface display for a list of users in a pool area.

Selecting the Pool Listing function on the Live Pool Area GUI of FIG. 13 causes the User Interface Module to generate the Live Pool List GUI of FIG. 15 depicting the pool as list of platform users within the pool area. The Live Pool List GUI displays profile data that includes, for example (i) platform user names; (ii) visual profile identifier data; (iii) age information; (iv) an identifier for the current location of the platform user (e.g., the name of a store or restaurant where the user is or may be located); and (v) an approximate geographic distance between the user computing device and the listed platform user. The Live Pool List GUI includes an "Everyone" tab function that configures the Live Pool List GUI to display all randomly selected platform users within the pool area, including users that are connected as friends as well as users that are not connected. The Live Pool List GUI further includes a "Friends" tab function that displays only platform users connected as friends.

User Interaction, Safety, and Events in Pool Area

For those users that are connected as friends, the Live Pool List GUI includes a Message function icon that, when selected, opens the Chat GUI and initiates sending a user chat message to the listed platform user. For those users that are not connected as friends, the Live Pool GUI displays a "connect" function shown as a "(+)" icon that sends a connect invitation message to the provider server that routes the connect invitation message to the target user who can Accept or Ignore the connect request message.

On either the Live Pool Area GUI or the Live Pool List GUI, users can select a user icon (e.g., a profile visual identifier on the map of FIG. 13 or a list item of FIG. 15), to generate Profile Display GUI for the selected user. The Profile Display GUI can be a truncated or "mini" version of the Profile Display GUI of FIG. 5. Users can select a "Delete" function that then removes the selected user from the pool area, which transmits a remove user request message to the provider server. The provider server removes the user and randomly selects a replacement user. The provider server then transmits to the user computing device profile data for the replacement user in a current pool data message or updated pool data message.

The Live Pool List GUI also includes a "Wave" function that transmits a wave request message to the provider server, which in turn routes the wave request message to the intended recipient user computing device. On receipt of the wave request message, the recipient user computing device vibrates and/or emits and audible notification and displays a graphical wave notification indicating that a wave request message has been received. The wave notification includes profile visual identifier data for the wave request sender as well as a function that displays other profile data for the wave request sender, such as the Profile Display GUIs shown in FIGS. 10(*a*) & (b).

The wave notification also includes "Accept," "Deny," and "Block" functions, and selecting one of these functions cause the user computing device to transmit a wave request response message to the provider server that includes wave response data indicating the user's selection of one of the three functions. If the wave request sender leaves the pool area before a wave request message receives a response, then the provider server transmits a wave request update message to the wave request recipient user computing device that indicates a change in status for the wave request sender. For example, the profile visual identifier for the wave request sender may change to a general person icon (e.g., silhouette of a head) before being removed from the wave notification altogether after five minutes. After removal from the wave notification, the user computing device and the provider server can also remove the wave request sender from the pool area and substitute profile data for a replacement platform user randomly selected by the provider server. The profile data for the replacement user is transmitted by the provider server to the user computing device in a current pool data message or updated pool data message.

Upon selection of the Accept function on the wave notification, the User Interface Module generates a Wave Messaging Session GUI that includes input functions for exchanging text data with the wave request sender. Selecting the Accept function also transmits a wave request response message to the provider server that routes the message to the wave request sender's user computing device. On receiving the wave request response message, the wave request sender's user computing device may vibrate or emit an audible notification, and the User Interface Module likewise generates a wave messaging communication session GUI that allows for the exchange of text data. The provider server establishes a communication session between the user computing devices to facilitate the efficient exchange of messages.

After accepting the wave request message, the wave request recipient and sender are removed from each other's respective pool areas by removing the platform user identifiers from the Current Pool Population database list. The provider server randomly selects replacement platform user identifiers and transmits to the respective user computing devices profile data for the respective replacement users in a current pool data message or updated pool data message. The replacement platform user identifiers are stored to the Current Pool Population database list.

A wave request message recipient user can also select a Deny input function on the wave notification that causes the RIPPL App to remove the wave request sender from the wave request recipient's pool area. The user computing device also transmits a wave request response message to the provider server that causes the provider server to remove the wave request sender from the wave request recipient's pool area. Upon removal, the provider server randomly selects a replacement platform user for the removed user, and the provider server sends a current pool data message or updated pool data message that includes profile data for the replacement platform user to include within the pool area. The provider server also sends a current pool data message or updated pool data message to the wave request sender's computing device that removes the wave request recipient from the wave request sender's pool area and that includes profile data for a replacement user.

Figure 16:
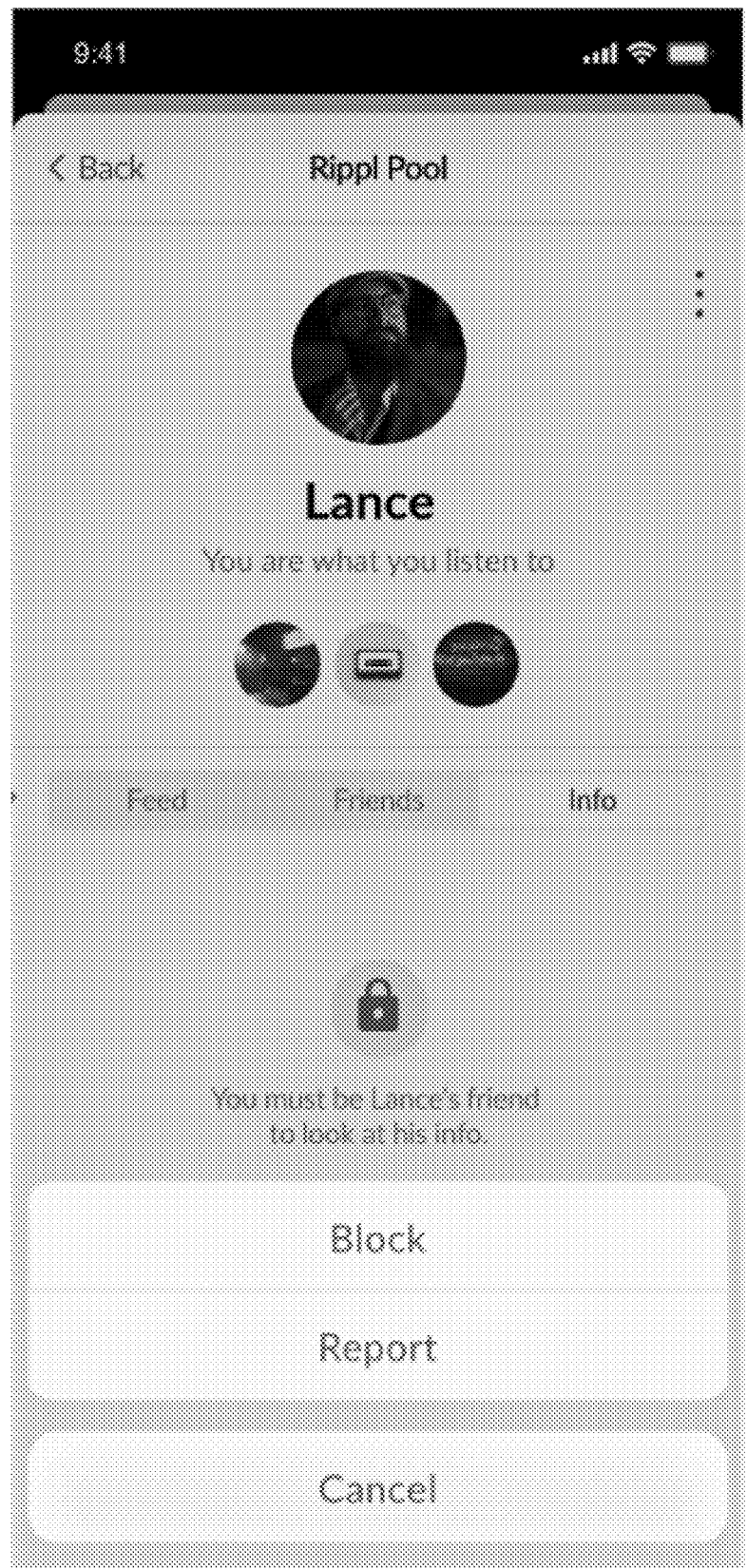
FIG. 16 is an example graphical user interface display for blocking or reporting users.

Selecting the Block function on the wave notification likewise removes the wave request recipient and sender from each other's respective pool areas and substitutes profile data for replacement users. Selecting the Block function also transmits a wave request respond message to the provider server that causes the provider server to generate connection data that precludes the wave request sender from ever contacting the wave request recipient or appearing in the recipient's pool area. The provider server stores the connection data to the profile data database records for the respective wave request recipient and sender. A Block function input is optionally available through the Profile Display GUI, as illustrated in FIG. 16, along with a Report function.

The Report function allows platform users to provide specific information to the provider regarding inappropriate or abusive platform user conduct in the form of text data, image data, audio data, video data, or menu selection data (e.g., radio button or pull down menu selections categorizing the conduct). Upon selection of the Report function, the RIPPL App can also generate a notification providing users with a telephone number for a local police department and encouraging users to report potential safety threats to law enforcement.

The Block and Report functions described above provide significant measures of security and privacy protection for platform users. The RIPPL software platform can incorporate additional features directed to curbing potential abuse of the wave feature, such as limiting the number of wave request messages a user can send within a predetermined time period (e.g., a limit of 5 waves an hour), or imposing such restrictions only for newly registered platform users or platform users that were recently the subject of a Report. Limitations on the number of wave request messages could be implemented by the provider server storing to a database a time stamp and corresponding platform user identifier for each wave request message and using the stored information to determine the number of wave request messages sent by a given user computing device each time a new wave request is received.

Figure 17:
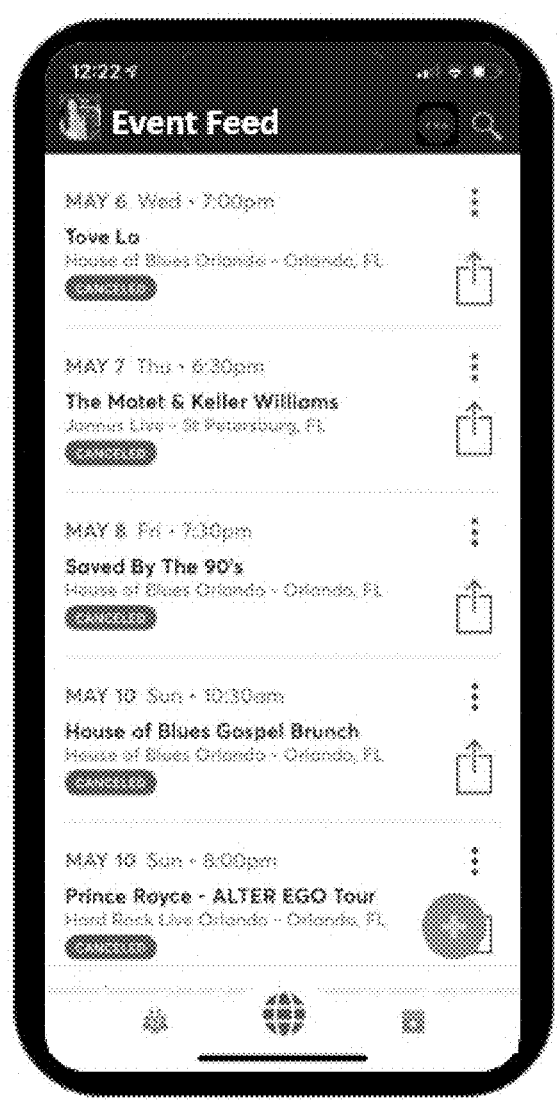
FIG. 17 is an example graphical user interface display for an events feed.

Turning again to the Live Pool Area GUI of FIG. 13, the interface can also include a search bar function that accept text input from users and allows users to search the pool area for other platform users, events, or vendors (e.g., restaurants, retailers, etc.). The Live Pool Area GUI includes other useful functions depicted in FIG. 13, such as a "Friend Feed" icon that displays the Friend Activity GUI, a Messages function that displays the Chat GUI, or an Event Feed function that causes the User Interface Module to generate the Event Feed GUI of FIG. 17.

On selection of the Event Feed function, the user computing device transmits an event data request message to the provider server to retrieve event data for display on the Event Feed GUI. The provider server responds by transmitting a current event data message to the user computing device. event data relates to historical, ongoing, or anticipated events, such as concerts, movies, sporting events, lectures, or a wide variety of other recreational, educational, commercial, or cultural activities of interest to platform users. The event data displayed to platform users can be limited to events having a geolocation within the pool area, or event data can be categorized and displayed to platform users according various criteria, such as prioritizing the display of events corresponding to the interest identifier data for a given user.

Event data can be obtained by the platform provider from vendors, individuals, or organizations responsible for an event and stored to the event data database. Event data can alternatively be obtained by the provider through data uploads by platform users, Internet searches, or searches of third party databases, and subsequently stored to the event data database and made available to platform users. Event data can include, for example: (i) identifying information for an event; (ii) date and time data specifying when an event has occurred or will occur and the expected duration of the event; (iii) location data where the event will take place; (iv) pricing or cost information; and (v) other data useful to platform users for participating in an event.

The Event Feed GUI can optionally include a Save function that allows platform users to store event data to the user computing device or to a database on the provider server for later review by the platform user as part of the My Stuff GUI, for example. The Event Feed GUI can also include menu options that generate tag status data associated and saved with the event data that indicate, for instance, whether a platform user is interested in going to an event or more definitively intends to attend the event. As disclosed above, selecting an event from the Event Feed GUI can also generate a notification that prompts the user for authorization to make the selection and associated tag status data available as activity data that is publicly available through display on the Friends Activity GUI as well as a desired permissions level (e.g., Friends Only, Everyone, etc.).

Although the foregoing description provides embodiments of the invention by way of example, it is envisioned that other embodiments may perform similar functions and/or achieve similar results. Any and all such equivalent embodiments and examples are within the scope of the present invention.

What is claimed is:

1. A system for creation of user device pools comprising:
a provider server comprising a provider server processor coupled to a first data storage device,
wherein the first data storage device comprises
non-transitory computer-readable medium with computer-readable code for instructing the provider server processor, and
at least one relational database comprising
pool area data defining a pool area,
a plurality of platform user identifiers (PUIDs),
wherein each of the PUIDs is associated with profile data that includes
platform user geolocation data,
connection data,
wherein the connection data represents a relationship between platform users, and
a platform user pool indicator having
a first value when the platform user geolocation data is within the pool area and
a second value when the platform user geolocation data is outside of the pool area,
wherein when the provider server processor executes the computer-readable code, the provider server processor performs operations comprising
receiving by the provider server, a pool data request message transmitted from a user computing device, wherein the pool data request message includes the user computing device geolocation data and a PUID;
comparing the user computing device geolocation data against the pool area data to determine whether the user computing device geolocation data falls within the pool area or outside of the pool area,
wherein when the user computing device geolocation data falls within the pool area, the provider server performs the operations comprising
selecting, at random, a preset number of Pool Population Set-Point PUIDs associated with a platform user pool indicator having a first value,
storing the Pool Population Set-Point number of PUIDs to the relational database as a Current Pool Population database list,
for each of the PUIDs in the Current Pool Population,
retrieving
detailed profile data when the connection data indicates a connection to the PUID, wherein detailed profile data includes all or a subset of available profile data, or
limited profile data when the connection data does not indicate a connection to the PUID, wherein limited profile data includes a subset of the detailed profile data, and
generating a current pool data message comprising
the Pool Population Set-Point number of PUIDs and the associated detailed profile data or limited profile data as determined from
the connection data, and
transmitting the current pool data message to the user computing device for display,
when the user computing device geolocation data falls outside of the pool area, the provider server performs the operations comprising
selecting PUIDs associated with connection data indicating a connection to the PUID,
retrieving detailed profile data for the selected PUIDs having a connection to the PUID, and
generating a current pool data message comprising detailed profile data for the selected PUIDs having a connection to the PUID, and
transmitting the current pool data message to the user computing device for display;
receiving by the provider server, a pool data update request message transmitted from a user computing device,
wherein the update request message comprises replacement platform user identifiers for any platform user identifiers that have left the pool area.

2. The system of claim 1, wherein prior to generating the current pool data message, the provider server performs further operations comprising:
(a) for each selected platform user identifier, retrieving associated privacy settings from the relational database, and
(b) filtering the profile data for each selected platform user identifier according to the privacy settings.

3. The system of claim 1, wherein the provider server performs further operations comprising:
(a) receiving from the user computing device, a wave request message that includes a wave recipient platform user identifier selected from the Current Pool Population;
(b) transmitting the wave request message to the wave recipient using the platform user identifier;
(c) receiving from the wave recipient, a wave request response message that includes a Response Selection, wherein when the Response Selection has a value of Accept, the provider server establishes a communication session between the user computing device and the wave recipient; and
(d) removing the wave recipient platform user identifier from the Current Pool Population.

4. The system of claim 3, wherein:
(a) the wave recipient platform user identifier is associated with connection data that does not indicate a connection to the PUID; and
(b) based on the connection data, the provider server establishes permissions data that does not permit the exchange of image data or video data during the communication session.

5. The system of claim 3, wherein the provider server performs the further operations comprising:

(a) receiving a connect invitation message from one of either the user computing device or the wave request recipient and receiving a connect invitation message confirmation;
(b) generating connection data indicating a connection between the PUID and the wave recipient; and
(c) based on the connection data, the provider server establishes permissions data that permits the exchange of image data or video data during the communication session.

6. The system of claim 1, wherein the provider server performs further operations comprising:
(a) receiving updated geographic location data for each platform user identifier in the Current Pool Population;
(b) determining whether the updated geographic location data is within the pool area;
(c) removing the platform user identifier from the Current Pool Population if the updated geographic location data is not within the pool area;
(d) selecting a replacement platform user identifier associated with a platform user pool indicator having a first value; and
(e) storing the replacement platform user identifier to the Current Pool Population database list.

7. The system of claim 1, wherein the provider server performs the further operation of transmitting a current event data message comprising event data to the user computing device.

8. The system of claim 7, wherein the event data comprises: (a) event identifying data; (b) event location data; and (c) event time data.

9. The system of claim 1, wherein the provider server performs the further operation of transmitting a current activity data message to the user computing device comprising activity data associated with the platform user identifiers having connection data indicating a connection to the PUID.

10. The system of claim 9, wherein the activity data comprises promotional opportunity data.

11. The system of claim 1, wherein:
(a) the provider server periodically received updated user computing device geolocation data transmitted by the user computing device;
(b) the pool area data is used by the provider server to define the pool area as having a geographic location and a geometric shape that encompasses the user computing device geolocation data; and
(c) the geographic location of the pool area changes in direct relationship to the updated user computing device geolocation data.

12. The system of claim 11, wherein pool area geometric shape is circular and centered on the user computing device geolocation data.

13. The system of claim 1, wherein pool area is three-dimensional and includes an elevation.

14. The system of claim 1, further comprising a user computing device processor coupled to a second data storage device, wherein the second data storage device comprises a second non-transitory computer-readable medium with computer-readable code for instructing the user computing device processor, wherein when the user computing device processor executes the second computer-readable code, the second computer-readable code implements a RIPPL software application ("RIPPL App") that is configured to perform operations comprising:

(a) interfacing with a global positioning system device ("GPS Device") integrated with the user computing device to obtain the user computing device geolocation data;
(b) calling a Map Application Programming Interface ("Map API") that (A) interfaces with a map database by utilizing the user computing device geolocation data to obtain map display data, and (B) returns the map display data to the RIPPL App;
(c) receiving the current pool data message from the provider server; and
(d) generating a Live Pool Area Graphical User Interface ("GUI") using the map display data and the profile data, wherein the Live Pool Area GUI comprises one or more selectable platform user elements that, when selected, display profile data for an associated platform user identifier.

15. The system of claim 13, wherein the RIPPL App applies user-selected profile data filter settings to remove one or more selectable platform user elements from the Live Pool Area GUI.

16. The system of claim 13, wherein:
(a) the provider server performs the further operation of transmitting a current event data message comprising event data to the user computing device; and
(b) the RIPPL App performs the further operation of displaying the event data on the Live Pool Area GUI.

17. The system of claim 13, wherein the RIPPL App performs the further operations of generating a Profile Display GUI that displays profile data for a selected platform user identifier.

18. A system for creation of user device pools comprising:
a provider server comprising a provider server processor coupled to a first data storage device, wherein the first data storage device comprises
(i) non-transitory computer-readable medium with computer-readable code for instructing the at least one provider server processor, and
(ii) at least one relational database comprising (A) a plurality of platform user identifiers (PUIDs) representing platform users, wherein each PUID is associated with profile data that includes platform user geolocation data and connection data, wherein the connection data represents a relationship between platform users, (B) a platform user pool indicator indicating when the user geolocation data is within the pool area, and (C) pool area data defining a geometric shape with reference to a geographic location,
wherein when the provider server processor executes the computer-readable code, the provider server processor performs operations comprising
(a) receiving a pool data request message transmitted from a user computing device, wherein the pool data request message includes the user computing device geolocation data and a PUID;
(b) determining a user computing device pool area utilizing the pool area data and the user computing device geolocation data;
(c) determining, for each PUID, using the associated platform user geolocation data, whether the platform user is within the user computing device pool area;
(a) selecting, at random, a preset number of Pool Population Set-Point PUIDs within the user computing device pool area, and for the preset number of Pool Population Set-Point PUIDs, retrieving (I) detailed profile data when the connection data indicates a connection to the PUID, wherein detailed profile data includes all or a subset of available profile data, and (II) limited profile data when the connection data does not indicate a connection to the PUID, wherein limited profile data includes a subset of the detailed profile data;

(b) generating a current pool data message comprising (I) the Pool Population Set-Point number of PUIDs and the associated detailed profile data or limited profile data as determined from the connection data;

(c) transmitting the current pool data message to the user computing device for display; and (d) receiving by the provider server, a pool data update request message transmitted from a user computing device, wherein the update request message comprises replacement platform user identifiers for any platform user identifiers that have left the pool area.

19. The system of claim 18, wherein the pool area data comprises a Pool Radius and the geographic location is the user computing device geolocation data, that are used to determine the user computing device pool area as a circular area extending a distance equal to the Pool Radius from the user computing device.

20. The system of claim 18, wherein:

(e) the at least one relational database further comprises a platform user pool area associated with each platform user identifier; and wherein (f) the step of determining, for each platform user identifier, whether the platform user is within the user computing device pool area, further comprises the operation of determining by the provider server whether platform user pool area and the user computing device pool area overlap.

* * * * *